United States Patent [19]
Davis

[11] Patent Number: 5,637,038
[45] Date of Patent: Jun. 10, 1997

[54] APPARATUS AND METHOD FOR SKINNING POULTRY

[76] Inventor: James F. Davis, 11976 Bells Ferry Rd., Canton, Ga. 30114

[21] Appl. No.: 500,487

[22] Filed: Jul. 10, 1995

[51] Int. Cl.$^6$ .............................. A22B 5/16; A22C 21/00
[52] U.S. Cl. ............................................ 452/130; 452/111
[58] Field of Search ................................. 452/125, 128, 452/129, 130, 111, 112, 113, 114

[56] References Cited

U.S. PATENT DOCUMENTS

| | | | |
|---|---|---|---|
| 3,930,283 | 1/1976 | Martin | 450/130 |
| 4,382,313 | 5/1983 | Harben, Jr. et al. | 452/111 |
| 4,570,293 | 2/1986 | Harben, Jr. et al. | 452/111 |
| 4,610,951 | 9/1986 | Martin et al. | 452/130 |
| 4,697,307 | 10/1987 | Martin et al. | 452/130 |
| 4,723,339 | 2/1988 | Van de Nieuwelaar et al. | 452/130 |
| 5,098,336 | 3/1992 | De Long | 452/130 |

FOREIGN PATENT DOCUMENTS

| | | | |
|---|---|---|---|
| 8502785 | 5/1986 | Netherlands | 452/111 |

*Primary Examiner*—Willis Little
*Attorney, Agent, or Firm*—Isaf, Vaughan & Kerr; Louis T. Isaf

[57] ABSTRACT

A poultry skinning apparatus comprising a plurality of elongated rollers rotatively mounted to a support frame at a declining angle to define a longitudinal processing path between a first end and a second end of each roller. Each elongated roller, in accordance with the preferred embodiments, defines a plurality of helical teeth and spaces, having a first helix angle, which extend about a longitudinal axis and define the periphery of each roller. The elongated rollers are independently mounted in pairs and define an adjustable pinch gap originating at the first ends of the rollers. In accordance with a first preferred embodiment, the elongated rollers include a reversed segment proximate to the second ends having a plurality of teeth and spaces at a second helix angle which opposes the first helix angle. The elongated rollers define a flat surface near the second ends in a second preferred embodiment and a second reversed segment of teeth and spaces is proximate to the first ends in a third preferred embodiment. A vertically adjustable second mounting assembly, in a fourth preferred embodiment, enables repositioning of the second ends of the elongated rollers to produce different roller slope angles. In accordance with preferred methods, the poultry skinning apparatus is interposed within a typical poultry processing assembly line to allow skinning of poultry fowl with no aging of the fowl being necessary.

49 Claims, 19 Drawing Sheets

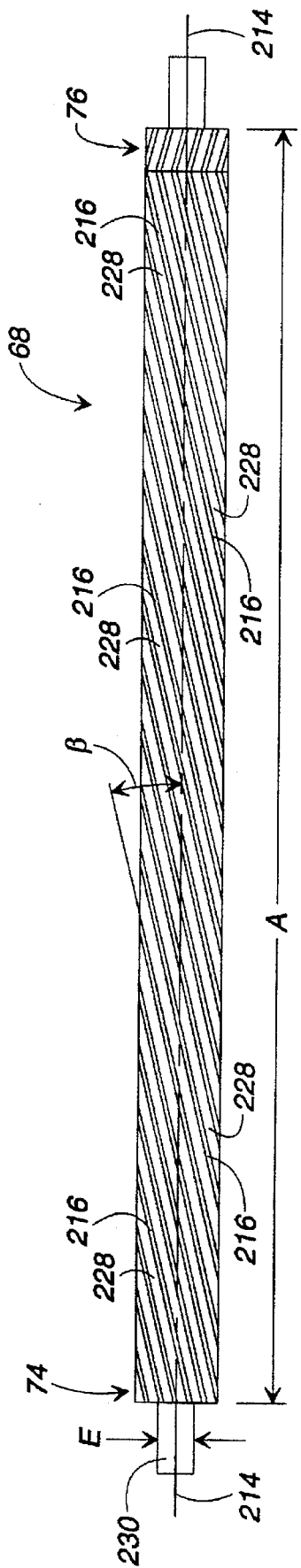
FIG. 7
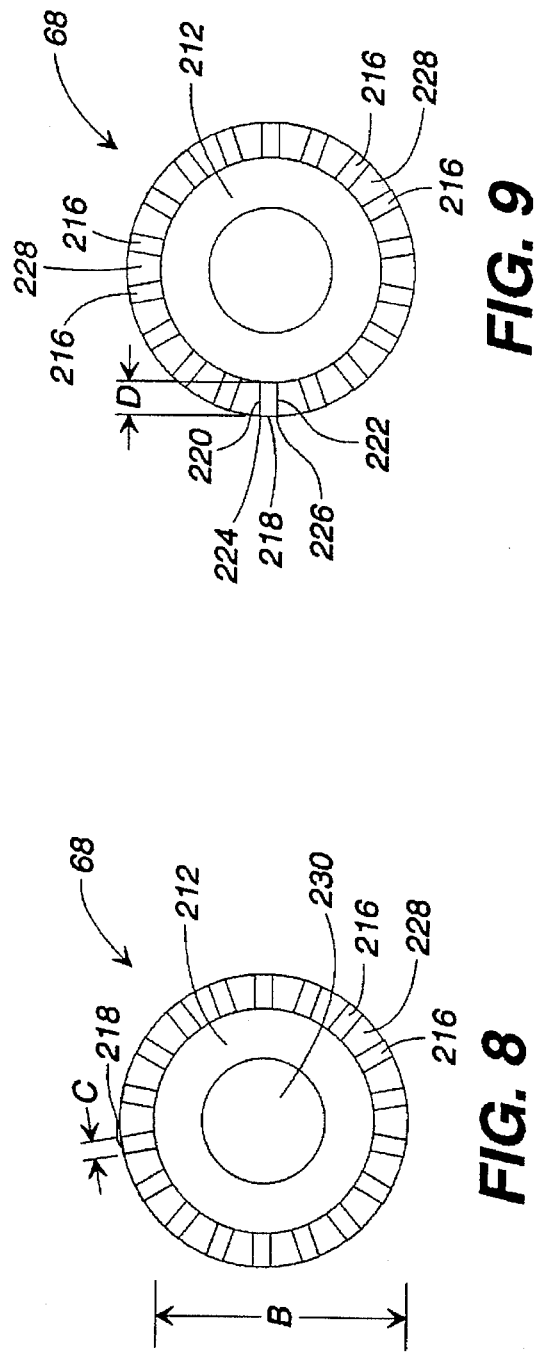
FIG. 9
FIG. 8

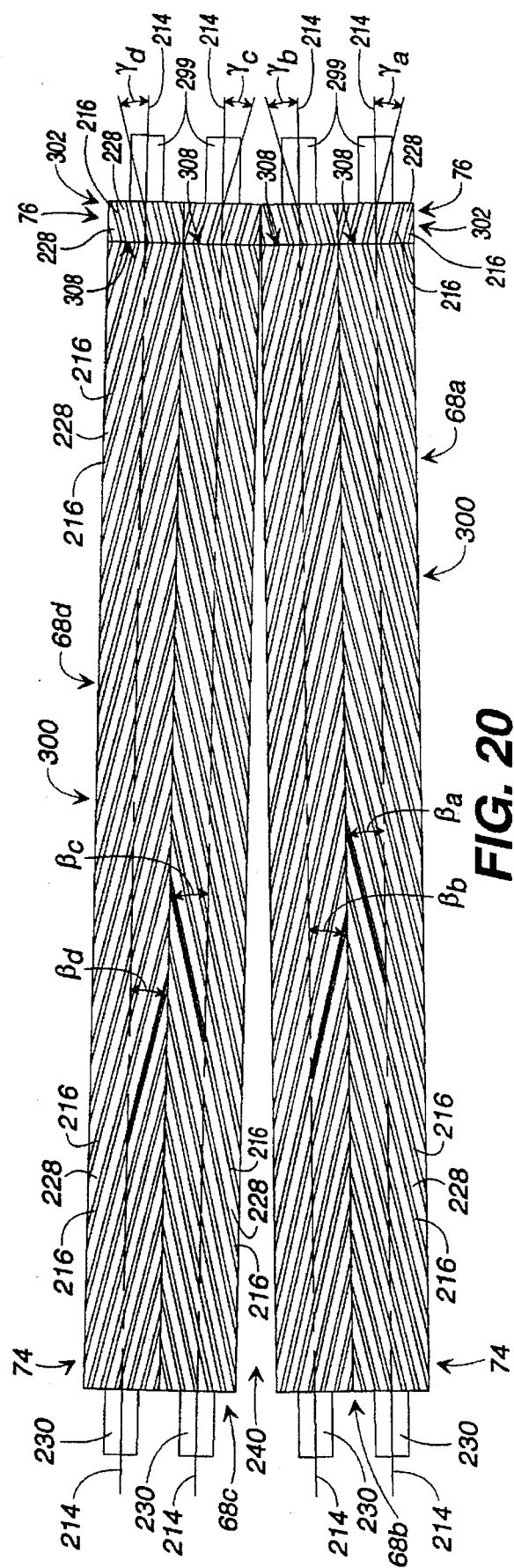
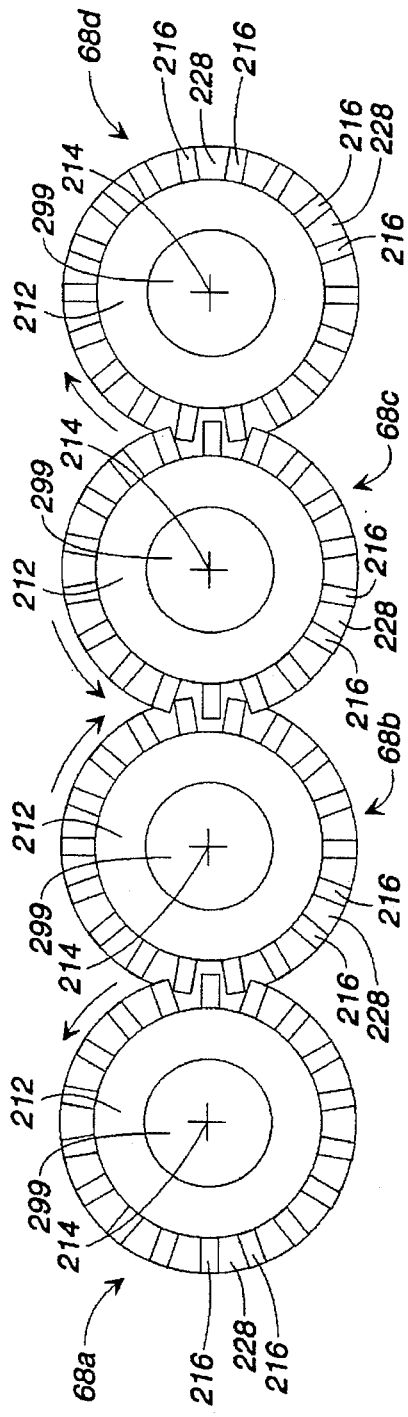
FIG. 20
FIG. 21

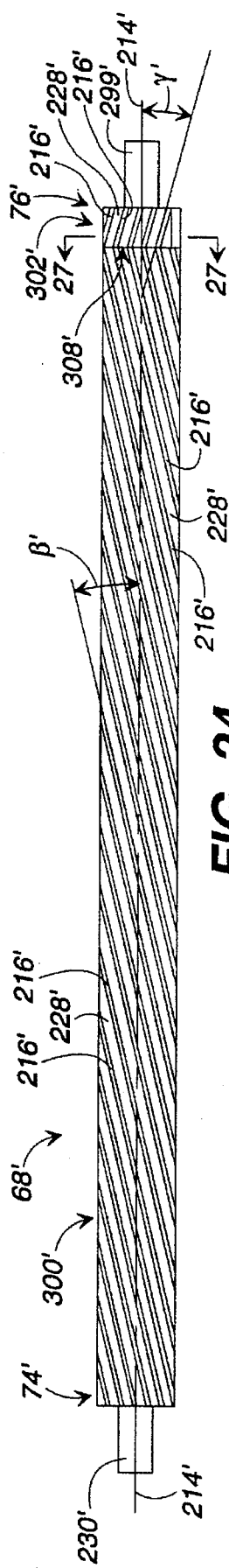
FIG. 24
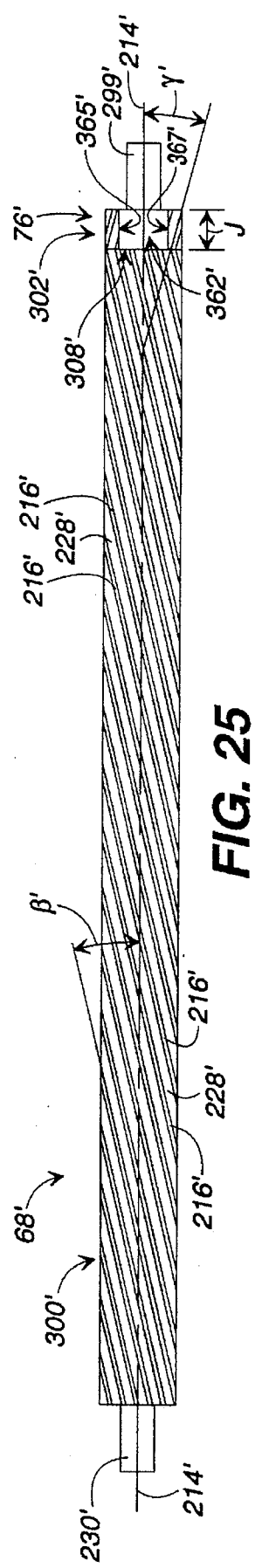
FIG. 25
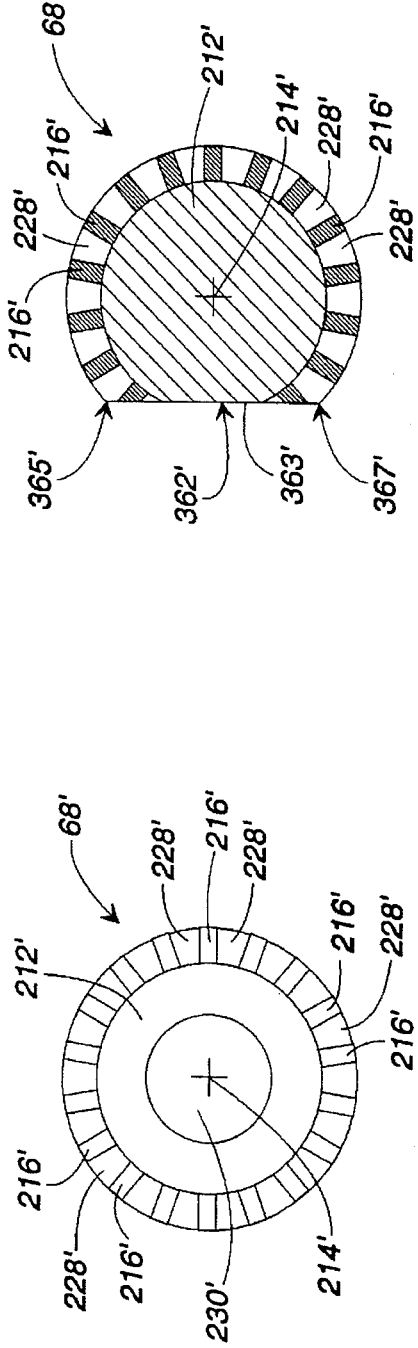
FIG. 27
FIG. 26

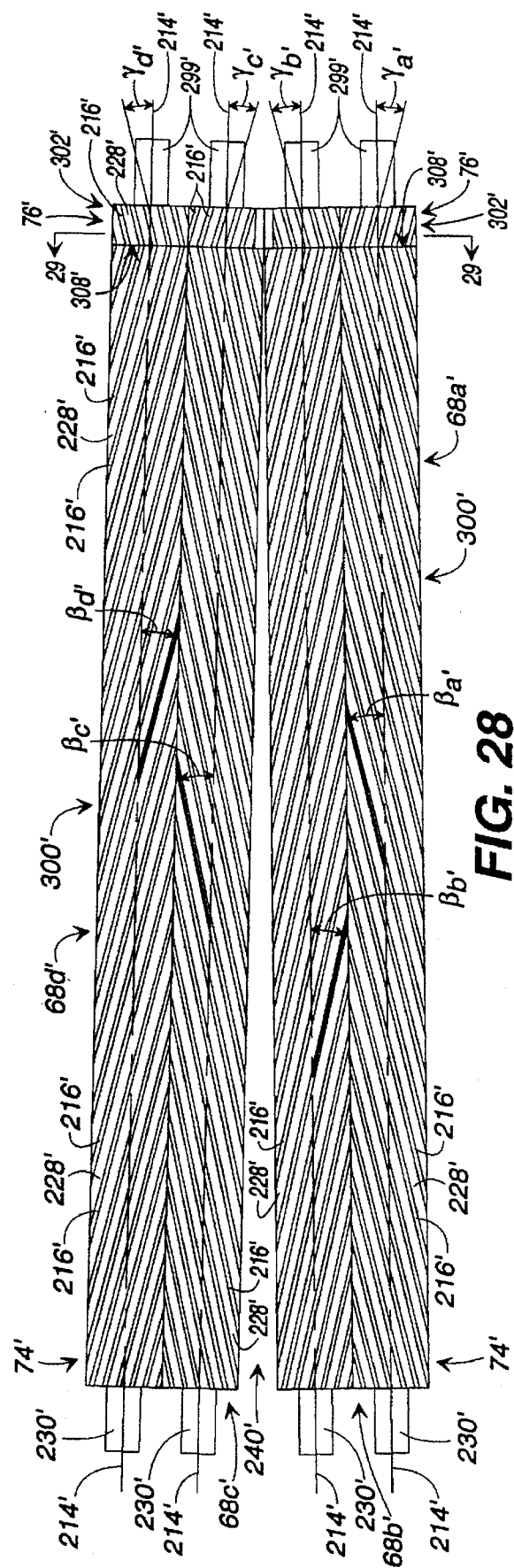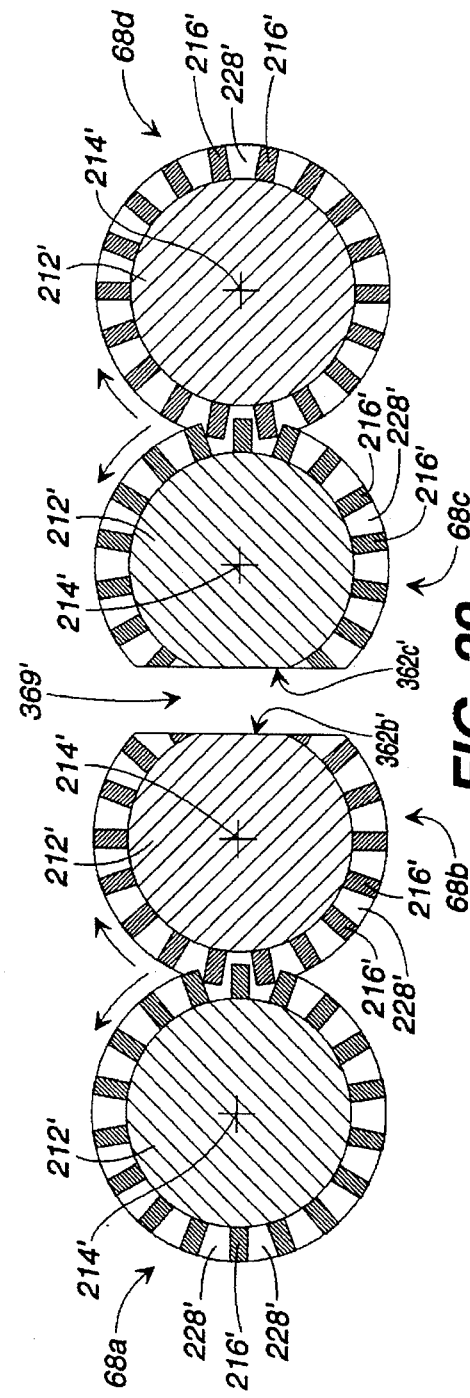

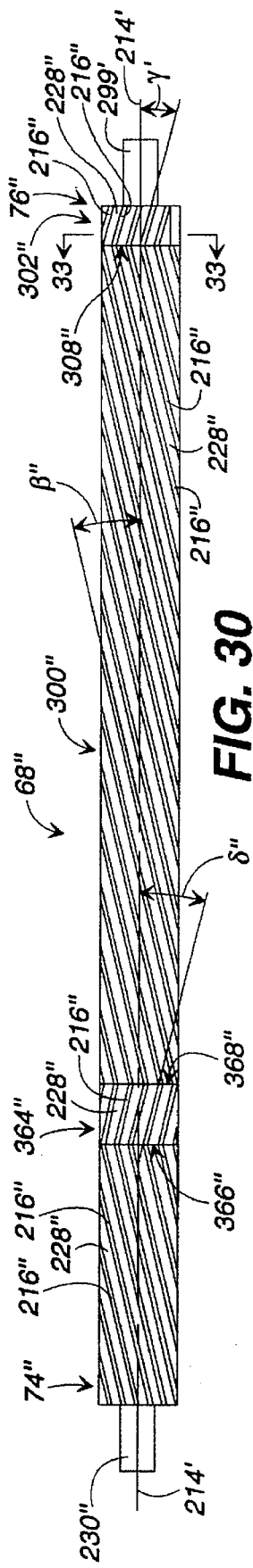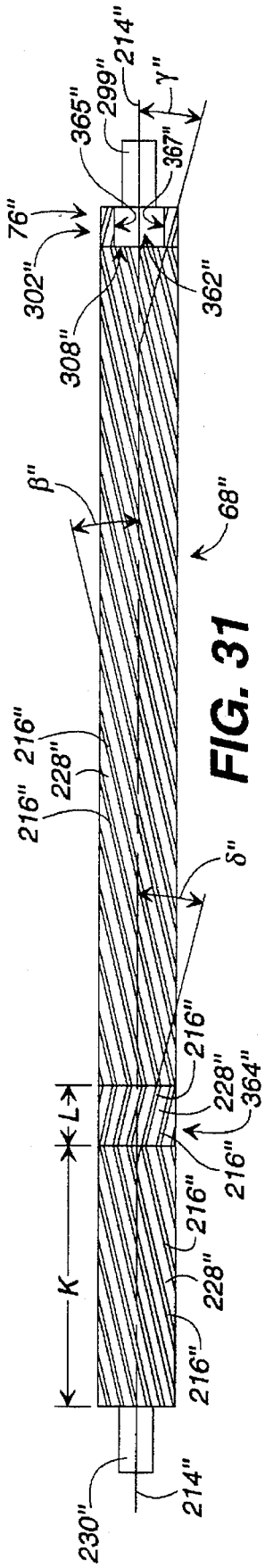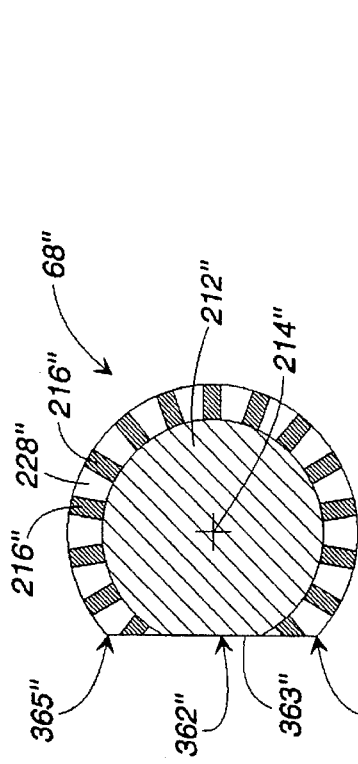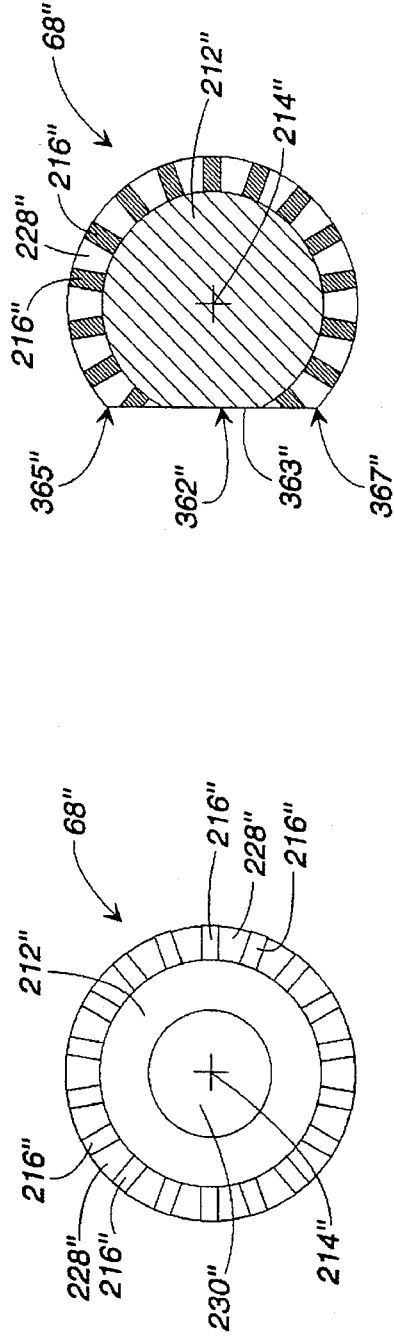

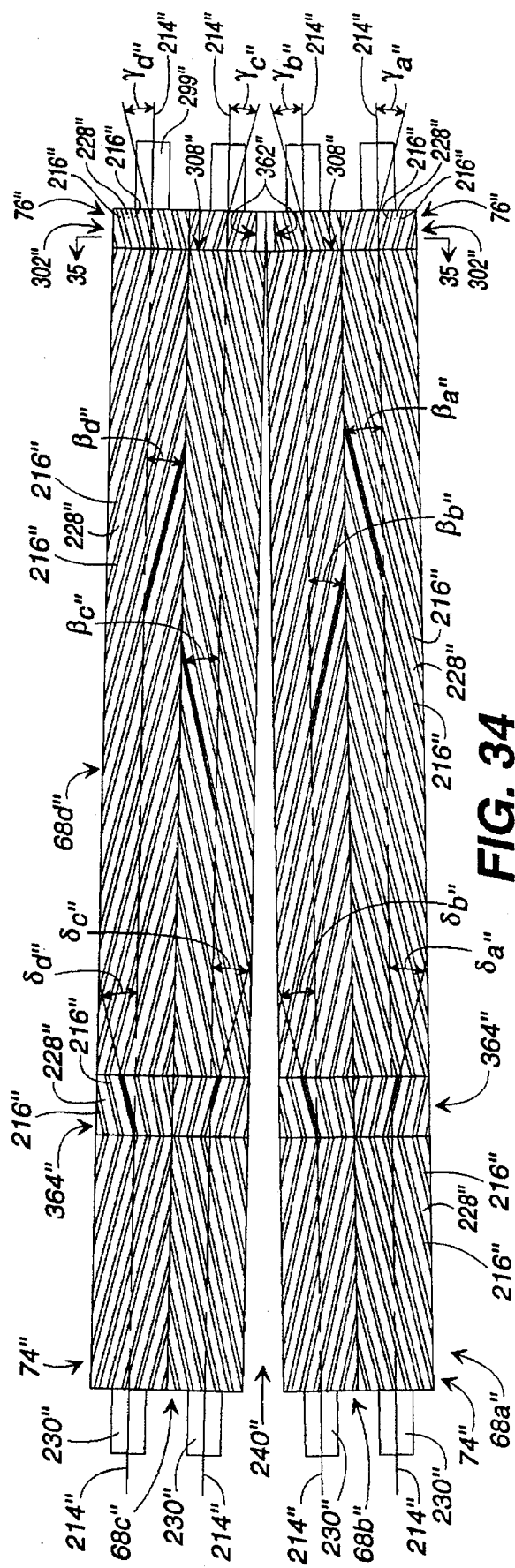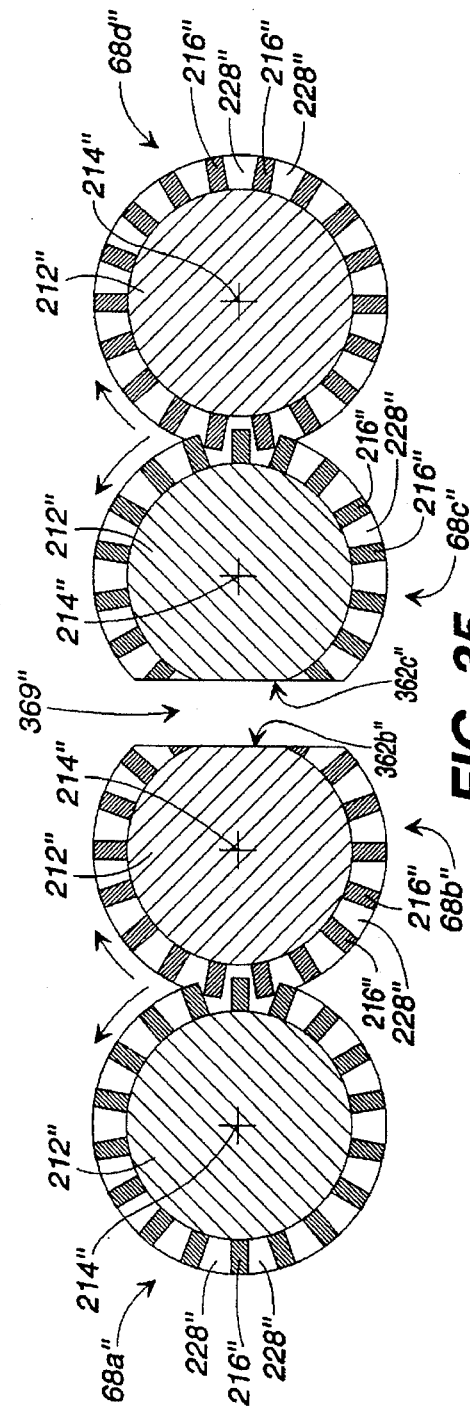

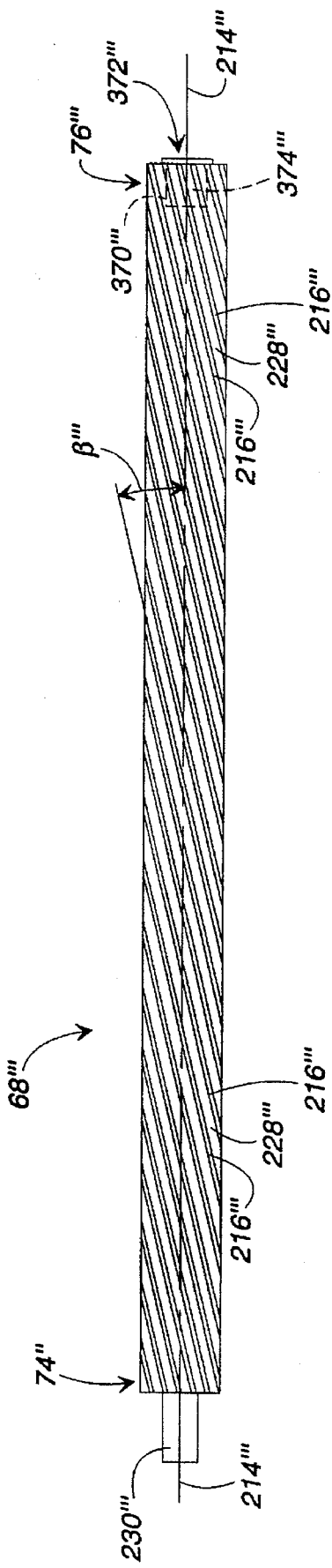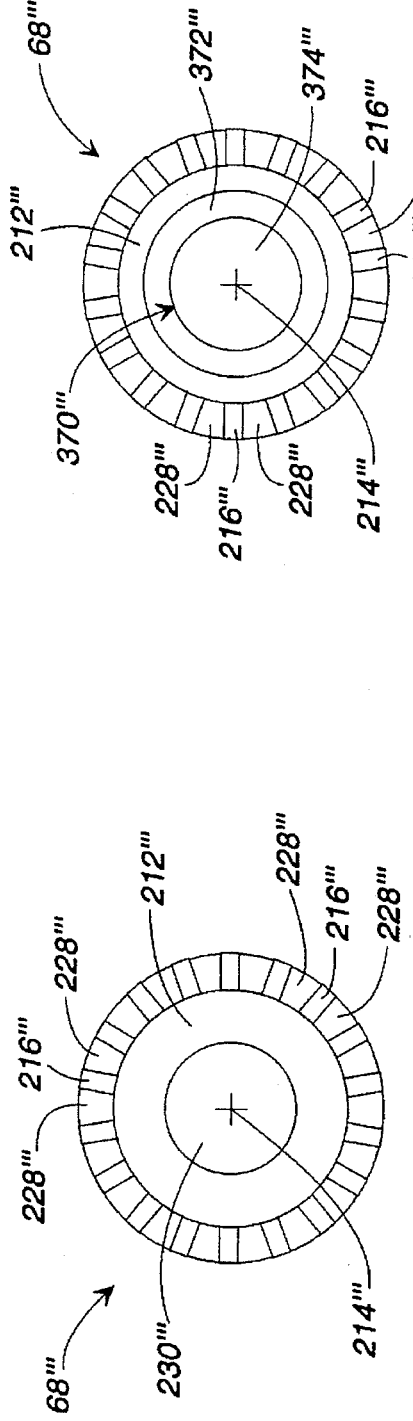
FIG. 36
FIG. 38
FIG. 37

APPARATUS AND METHOD FOR SKINNING POULTRY

BACKGROUND OF THE INVENTION

The present invention related generally to the field of poultry processing and, in its most preferred embodiments, to the field of apparatus and methods for skinning poultry.

Today, poultry products comprise an ever-growing portion of the diet consumed by humans and animals around the world. Poultry products, including those derived from chickens and turkeys, are delivered to consumers in a variety of forms with many consumers preferring products which are boneless and/or skinless. To produce a boneless product, a poultry processor may employ in-line automated deboning machinery which is capable of removing necessary bones to yield the various desired end products. Such automated deboning machinery, generally, interacts smoothly with the remainder of a poultry processing plant's equipment and operations to enable fast, continuous processing of a bird. Unfortunately, to produce a skinless product, a bird's skin must usually be removed by hand after off-line "aging" of the bird's skin, thereby disrupting the desirable, continuous on-line processing of a bird.

In a typical poultry processing plant, the body of a chicken or turkey is first eviscerated to remove the bird's internal organs. After evisceration, the bird is conveyed to a sizing and cut-up operation where the bird is weighed and routed to one of many cutting lines where each cutting line comprises equipment which has been appropriately configured for a particular range of bird weights. The cutting equipment slices the bird's body into a "front half", including the breasts, wings, ribs, and a portion of the backbone, and a "back half" or "saddle", including the thighs, legs, and the remaining portion of the backbone. The front and back halves are then conveyed to an off-line "aging" process where the bird halves are packed in ice and stored in a cooler for approximately 24 hours. The aging process is partially necessary to enable easier removal of the bird's skin when the bird halves are removed from the cooler and introduced into an on-line deboning operation where the skin is, generally, removed by hand. Unfortunately, the aging process and related handling of the bird halves can contribute to the growth of bacteria which may be harmful to humans. Also, the manual handling of the bird halves required by the off-line aging process coupled with the hand removal of the bird's skin increase the labor costs associated with producing a skinless poultry product for consumers.

Perhaps because the most profitable end products (i.e., the breasts) are derived from the front half, a few attempts have been made to develop automated equipment which can skin the front half of a bird's body. One such machine requires special cutting and handling to properly orient the front half of the bird before the skinning process begins. Another machine employs special cutting rollers and a knife to remove the skin while the from half travels laterally across the rollers and knife. Neither machine, however, eliminates or reduces the need for the aging process and, therefore, does not enable continuous processing of a bird between the evisceration and deboning operations.

There is, therefore, a need in the industry for an apparatus and method which can skin the front half of a chicken, turkey, or similar poultry fowl without requiring prior off-line aging of the front half and can solve other related and unrelated problems that become apparent upon reading and understanding this specification.

SUMMARY OF THE INVENTION

Briefly described, the present invention includes a poultry skinning system which enables the removal of skin from the front half of a poultry fowl, including at least chickens and turkeys, without the aging step normally required to produce skinless end products in a conventional poultry processing plant. More particularly, the present invention includes a poultry skinning system which employs a plurality of rotating, intermeshing, spiral-toothed, elongated rollers to create a pinching action which first engages or grasps the skin and a subsequent pulling action which tears the skin away from the front half of the bird.

In the preferred embodiments of the apparatus of the present invention, four elongated rollers having helically-extending teeth are rotatively mounted in a support frame. The elongated rollers extend longitudinally, in a downwardly sloping plane, between an intake conveyor and a discharge end of the poultry skinner. The first ends of the elongated rollers are adjustably mounted in counterrotating pairs, with each pair including an inner and outer roller. The inner elongated rollers of each pair define a gap (also referred to herein as a pinch gap) near their first ends and, hence, near the intake conveyor. By virtue of the adjustable mounting and interaction of the elongated rollers with other components of the apparatus, the pairs of elongated rollers are capable of being independently positioned to define pinch gaps of various widths. The second ends of the elongated rollers, in accordance with a preferred embodiment, are adjustably mounted in a mounting assembly having a vertical position which is alterable to modify the angle (also referred to herein as a slope angle) of the sloping plane in which the elongated rollers extend.

The elongated rollers, in accordance with certain preferred embodiments, include reversed segments of teeth (i.e., a segment having teeth which define a helix angle opposite to the helix angle defined by an adjacent segment of teeth) near their second ends to aid in discharging removed skin which has become lodged in the spaces between the teeth of the rollers, thereby reducing skin removal efficiency. To additionally aid in discharging removed skin from the inner elongated rollers when front halves are processed, a reversed segment of each inner roller also has a flat surface which is oriented to produce a vertical gap between the inner rollers for each rotation of the rollers. The vertical gap thus produced enables removed skin to fall, by virtue of gravity, into a skin discharge chute extending beneath the elongated rollers. An additional reversed segment is employed in a third preferred embodiment near the first end of each elongated roller. The additional reversed segment enhances the pinching action created by the counterrotating inner rollers, thereby enabling the inner rollers to better grasp and maintain their grasp of the skin.

In accordance with a preferred method of the present invention, the poultry skinner is interposed in a poultry processing assembly line between cutting and deboning steps (and, hence, between cutting and deboning equipment) to skin front halves of chickens, turkeys, and other poultry fowl without prior aging (which requires removing the front halves from assembly line processing) or cooling (whereby the temperature of the front halves is reduced) of the front halves. The from halves are conveyed directly from the cutting step to the skinning step where the intake conveyor of the poultry skinner serially receives the front halves. The intake conveyor transports the front halves to a position above the first ends of the elongated rollers. After falling onto the rotating elongated rollers, each front half is moved primarily by the inner rollers in a longitudinal direction, defined between the first and second ends of the rollers, toward the elevationally lower discharge end of the poultry skinner. Upon initial contact with the rollers at the pinch gap, a portion of the front half is instantaneously pulled slightly downward between the counterrotating inner rollers and into the pinch gap, thereby enabling the rollers to initially engage the skin and begin pulling it away from the membrane located immediately beneath the skin. Upon subsequent contact of a turkey front half with a reversed segment near the pinch gap, the rollers gain a better grasp of the skin. As the front half is propelled toward the discharge end, the front half remains principally in contact with the inner rollers which continue to grasp and pull skin away from the membrane. The outer rollers, rotating in a direction opposite to an adjacent inner roller, mesh with the inner rollers to dislodge loose skin which otherwise adheres to the inner rollers. The meshing of the teeth of the outer rollers with the spaces of the inner rollers also squeezes removed skin in the clearance gap created by the meshing action, thereby emulsifying a portion of the removed skin. After being transported to the second end of the elongated rollers while having its skin removed, the front half falls into a product discharge chute from which it is immediately removed and placed onto deboning equipment.

Accordingly, an object of the present invention is to remove the skin from the front half of a chicken, turkey, or other poultry fowl without exposing the front half to an off-line aging process.

Another object of the present invention is to remove the skin from the front half of a chicken, turkey, or other poultry fowl while conveying the front half in a continual manner between the cutting and deboning steps of poultry processing.

Still another object of the present invention is to remove the skin from the front half of a chicken, turkey, or other poultry fowl without damaging the membrane located immediately beneath the skin.

Still another object of the present invention is to remove the skin from the front half of a chicken, turkey, or other poultry fowl while conveying the front half in a longitudinal path.

Still another object of the present invention is to remove the skin from the front half of a poultry fowl while conveying the front half within a downward sloping plane.

Still another object of the present invention is to remove the skin from the front half of a poultry fowl by exposing the skin to at least two counterrotating rollers having spirally-extending teeth and spaces.

Still another object of the present invention is to remove the skin from the front half of a poultry fowl while conveying the front half in a longitudinal direction atop at least two longitudinally-extending elongated rollers.

Still another object of the present invention is to create a pinch gap between two elongated rollers to enhance grasping of the skin of a poultry fowl's front half.

Still another object of the present invention is to create a pinch gap between two elongated rollers having an adjustable gap width.

Still another object of the present invention is to position a plurality of elongated rollers having spirally-extending teeth in a common plane which slopes downward between an intake end and a discharge end.

Still another object of the present invention is to position a plurality of elongated rollers having spirally-extending teeth in a common plane having an adjustable slope angle.

Still another object of the present invention is to incorporate a reversed segment of teeth near the first end of an elongated roller having a plurality of teeth to enhance grasping of the skin of a poultry fowl's front half.

Still another object of the present invention is to incorporate a reversed segment of teeth at the second end of an elongated roller having a plurality of teeth to aid in dislodging portions of skin removed from a poultry fowl's front half.

Still another object of the present invention is to incorporate flat surfaces at the second end of an elongated roller to improve the discharging of skin removed from a poultry fowl's front half which stubbornly adheres to the elongated roller.

Still another object of the present invention is to emulsify removed skin for disposal.

Still another object of the present invention is to discourage the growth of bacteria during processing of a poultry fowl's front half by eliminating the need for aging.

Still another object of the present invention is to reduce the amount of manual handling of a poultry front half during processing.

Still another object of the present invention is to reduce the labor cost associated with the removal of skin from the front half of a chicken, turkey, or other poultry fowl.

Other objects, features, and advantages of the present invention will become apparent upon reading and understanding the present specification when taken in conjunction with the appended drawings.

BRIEF DESCRIPTION OF THE DRAWINGS

FIG. 7 is a schematic, top view of an elongated roller of the poultry skinner of FIG. 1

FIG. 8 is a schematic, end, elevational view of the elongated roller of FIG. 7 taken from a first end.

FIG. 9 is a schematic, end, elevational view of the elongated roller of FIG. 7 taken from a second end.

FIG. 20 is a schematic, top view of a plurality of elongated rollers of a poultry skinner in accordance with the first preferred embodiment of the present invention.

FIG. 21 is a schematic, end, elevational view of the plurality of elongated rollers of FIG. 20 taken from the second end.

FIG. 24 is a schematic, top view of an elongated roller of a poultry skinner in accordance with a second preferred embodiment of the present invention.

FIG. 25 is a schematic, side view of the elongated roller of FIG. 24.

FIG. 26 is a schematic, end, elevational view of the elongated roller of FIG. 24 taken from a first end.

FIG. 27 is a schematic, sectional view of the elongated roller of FIG. 24 taken along lines 27—27.

FIG. 28 is a schematic, top view of a plurality of elongated rollers of a poultry skinner in accordance with the second preferred embodiment of the present invention.

FIG. 29 is a schematic, sectional view of the plurality of elongated rollers of FIG. 28 taken along lines 29—29.

FIG. 30 is a schematic, top view of an elongated roller of a poultry skinner in accordance with a third preferred embodiment of the present invention.

FIG. 31 is a schematic, side view of the elongated roller of FIG. 30.

FIG. 32 is a schematic, end, elevational view of the elongated roller of FIG. 30 taken from a first end.

FIG. 33 is a schematic, sectional view of the elongated roller of FIG. 30 taken along lines 33—33.

FIG. 34 is a schematic, top view of a plurality of elongated rollers of a poultry skinner in accordance with the third preferred embodiment of the present invention.

FIG. 35 is a schematic, sectional view of the plurality of elongated rollers of FIG. 34 taken along lines 35—35.

FIG. 36 is a schematic, top view of an elongated roller of a poultry skinner in accordance with a fourth preferred embodiment of the present invention.

FIG. 37 is a schematic, end, elevational view of the elongated roller of FIG. 36 taken from a first end.

FIG. 38 is a schematic, end, elevational view of the elongated roller of FIG. 36 taken from a second end.

DETAILED DESCRIPTION OF THE PREFERRED EMBODIMENTS

Figure 1:
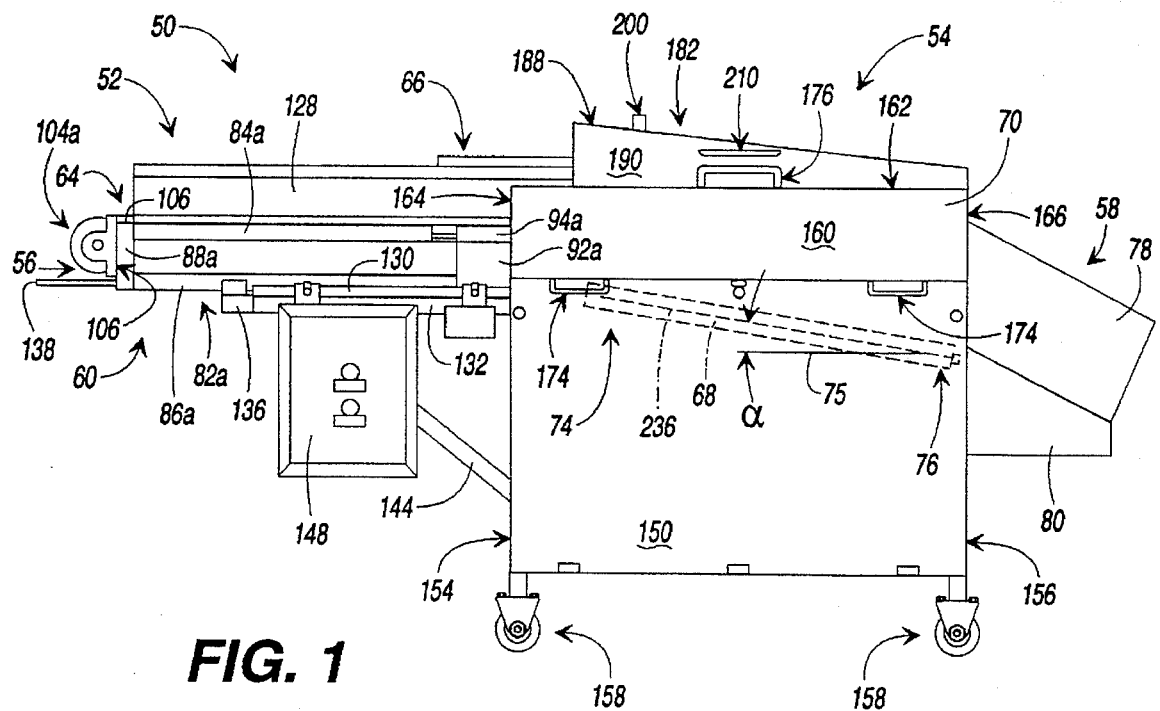
FIG. 1 is a front, elevational view of a poultry skinner in accordance with the preferred embodiments of the present invention.
Figure 2:
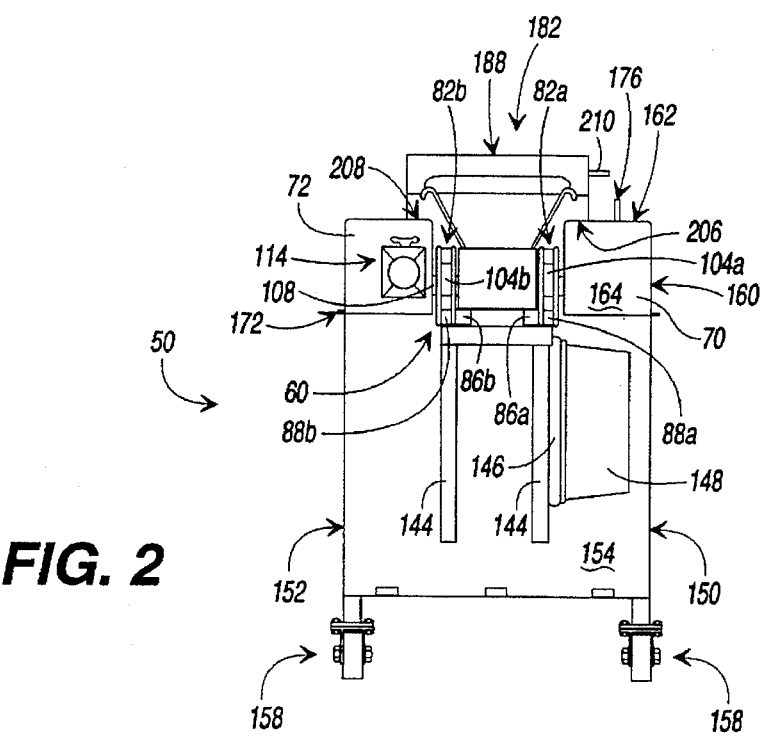
FIG. 2 is an end, elevational view of the poultry skinner of FIG. 1 taken from an intake end.
Figure 3:
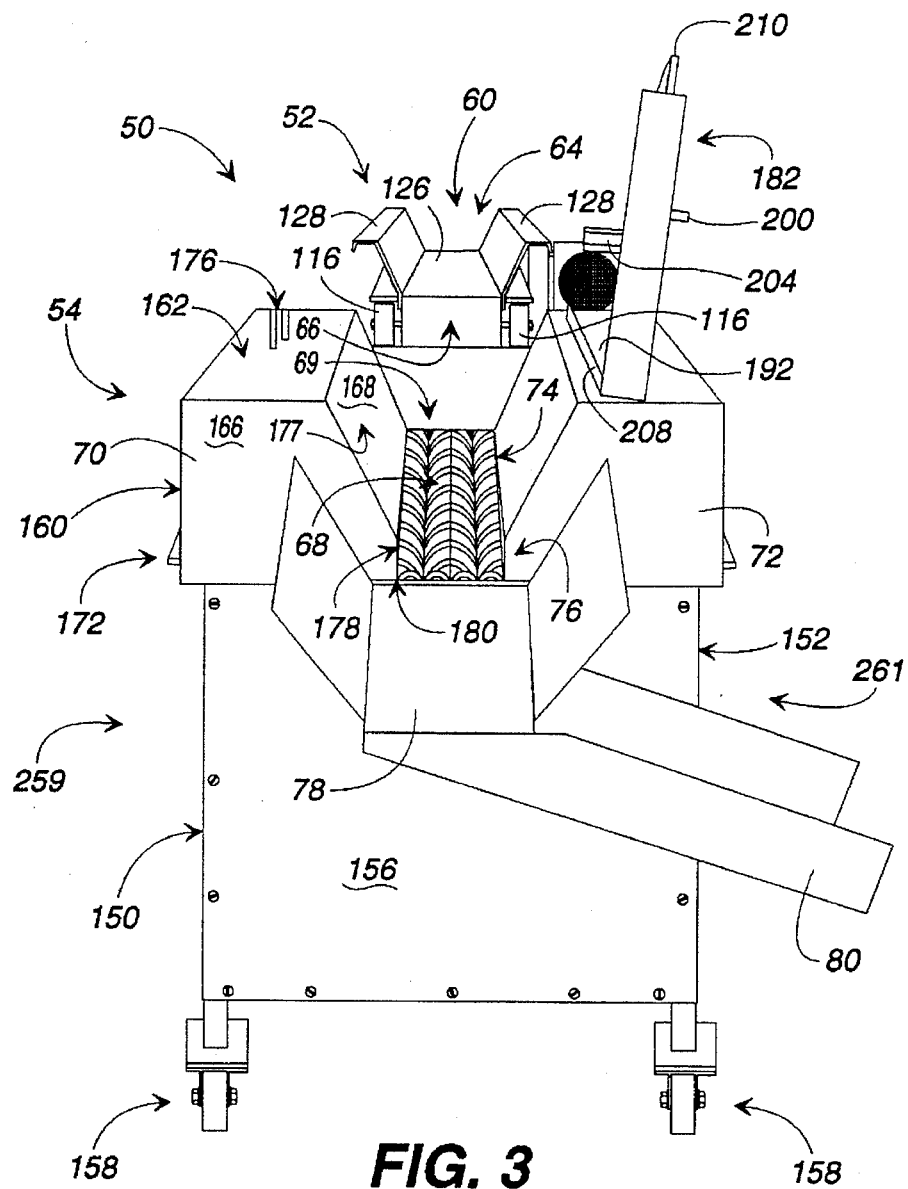
FIG. 3 is an end, perspective view of the poultry skinner of FIG. 1 taken from a discharge end.
Figure 6B:
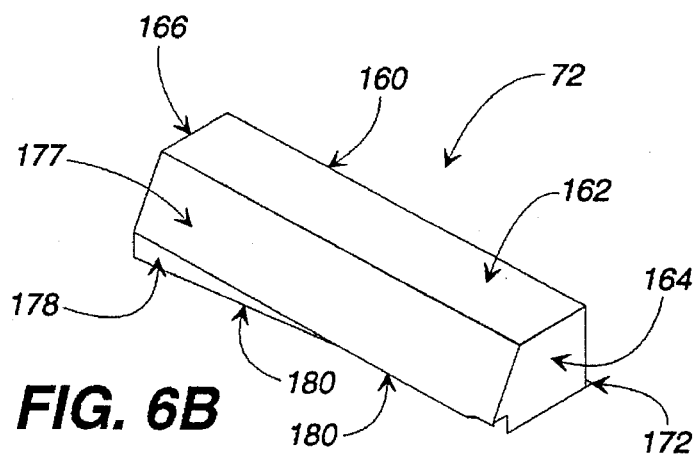
FIG. 6B is a top perspective view of a front cover of the poultry skinner of FIG. 6A.

Referring now to the drawings, in which like numerals represent like components throughout the several views, a poultry skinner 50, in accordance with the preferred embodiment of the present invention, is shown schematically in FIGS. 1–3. The poultry skinner 50 comprises an intake portion 52 and a skinning portion 54 interposed between an intake end 56 and a discharge end 58 which define a longitudinal axis of the poultry skinner 50. The intake portion 52 includes a conveyor 60 which is slidably mounted to a support frame 62 (see FIG. 4) to enable sliding of the conveyor 60 relative to the skinning portion 54 along the longitudinal axis of the poultry skinner 50. The conveyor 60 extends, generally, from a first end 64 located near intake end 56 to a second end 66 proximate to the skinning portion 54. Preferably, the skinning portion 54 includes a plurality of elongated rollers 68 which reside within a trough 69 formed by front and back covers 70,72. The elongated rollers 68 are rotatively mounted to the support frame 62 and have a first end 74 positioned proximate to and below the second end 66 of conveyor 60. Extending longitudinally to a second end 76 located near discharge end 58 and below their first end 74, the elongated rollers 68 define a common plane 236 sloping downward toward the discharge end 58 to form slope angle, "α", with a horizontal plane 238 as shown in FIG. 1. A first discharge chute 78 removably connects to the poultry skinner 50 near the second end 76 of the elongated rollers 68 to expedite the removal of skinned poultry. A second discharge chute 80 removably extends from below the first discharge chute 78 and the elongated rollers 68 to facilitate the discharge of removed poultry skin.

Figure 5:
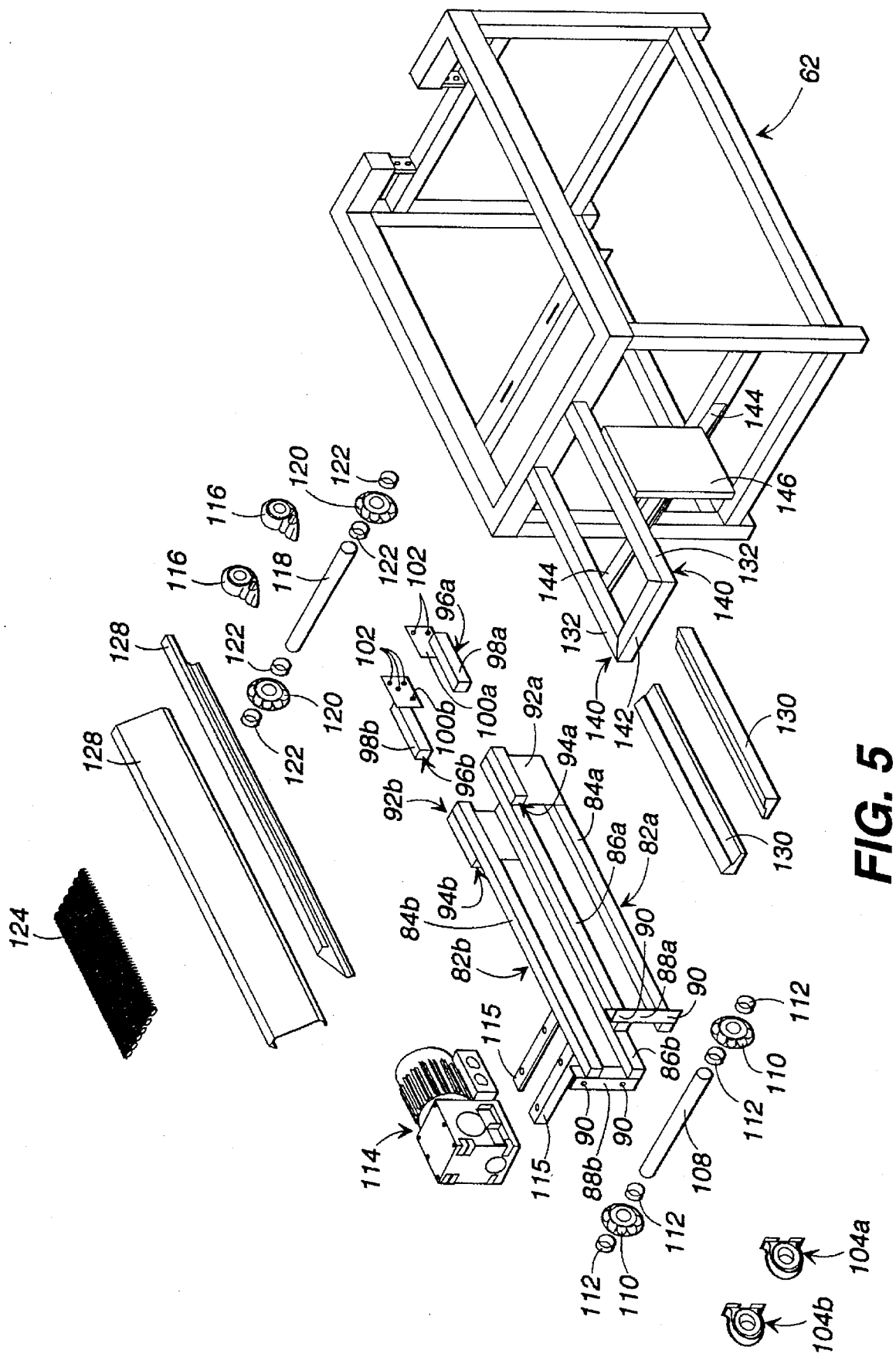
FIG. 5 is a partial exploded view of the poultry skinner of FIG. 1 displaying the components of an intake portion.
Figure 6A:
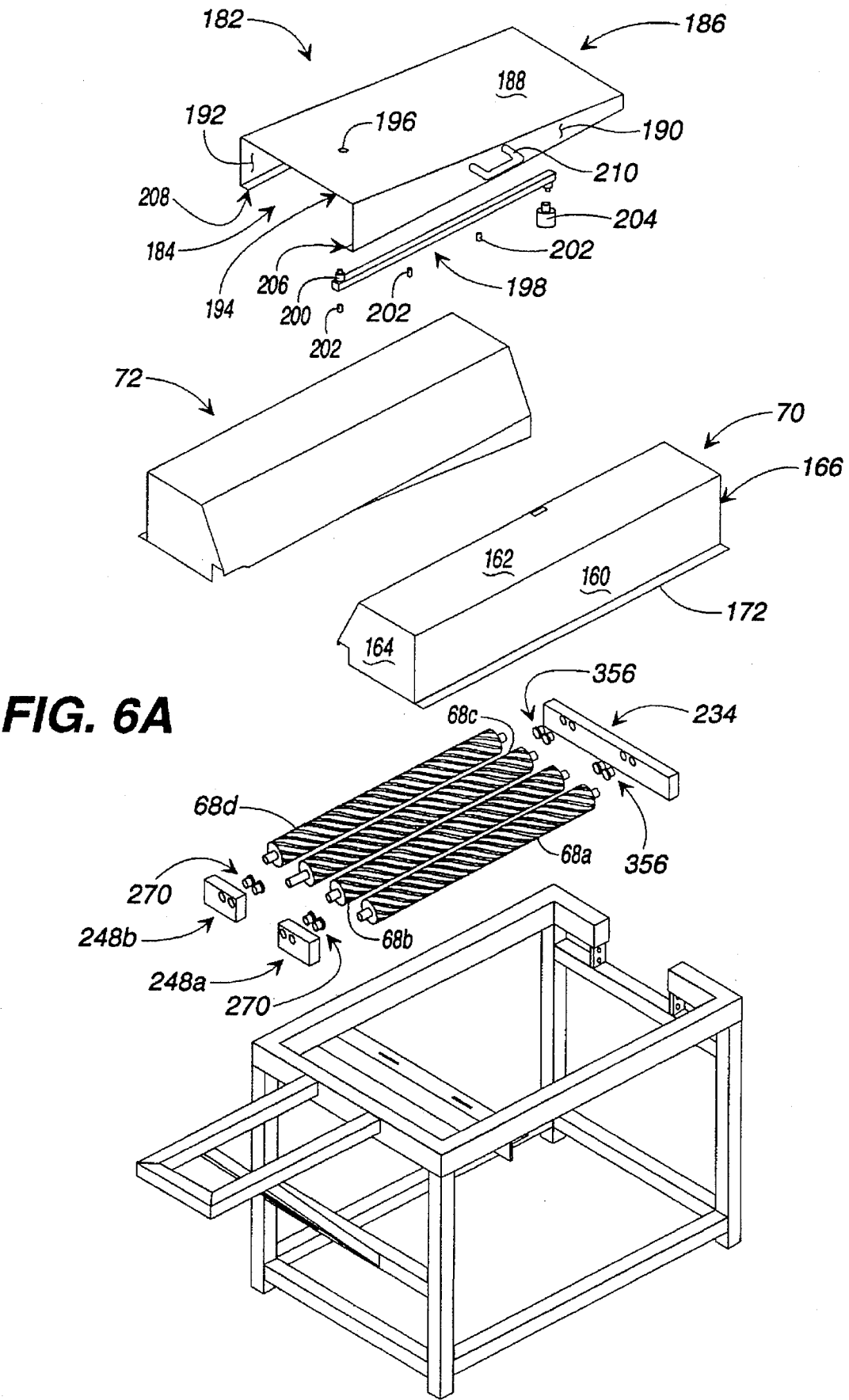
FIG. 6A is a partial exploded view of the poultry skinner of FIG. 1 displaying the components of a skinning portion.
Figure 10:
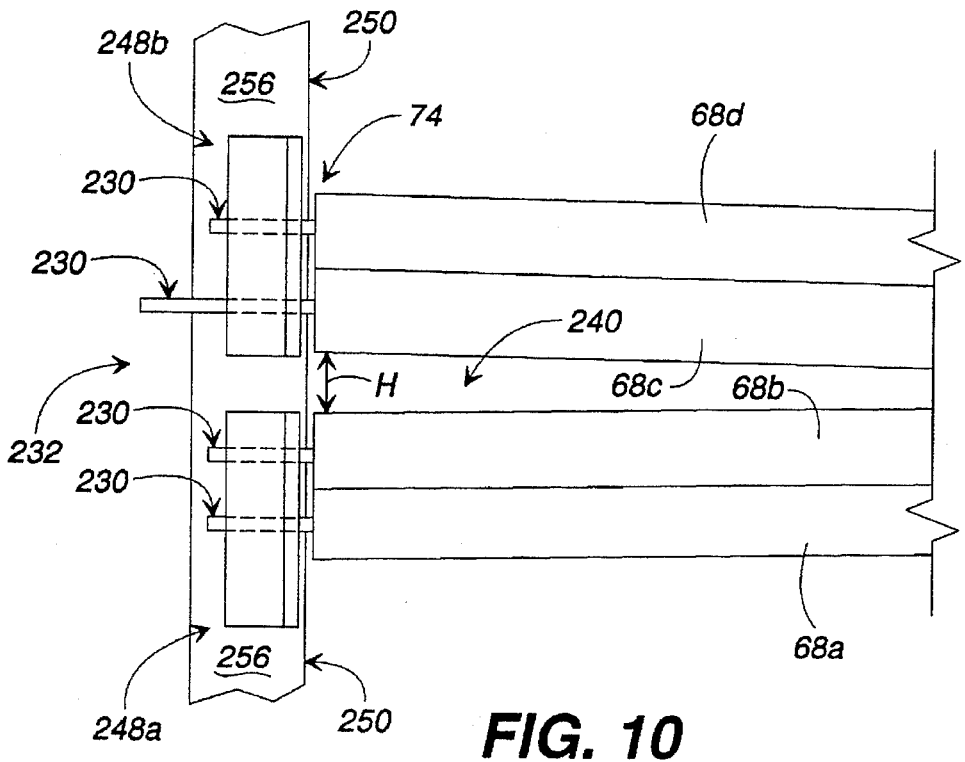
FIG. 10 is a partial schematic, top view of a first mounting assembly of the poultry skinner of FIG. 1.
Figure 12:
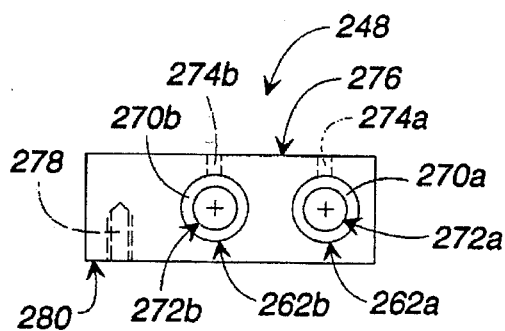
FIG. 12 is a front, elevational view of a mounting block of the first mounting assembly of FIG. 10.
Figure 14:
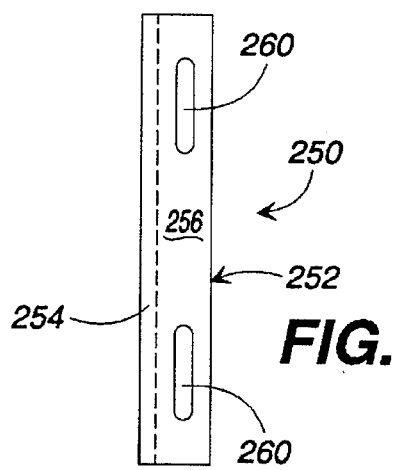
FIG. 14 is a top view of a lateral member of the first mounting assembly of FIG. 10.
Figure 13:
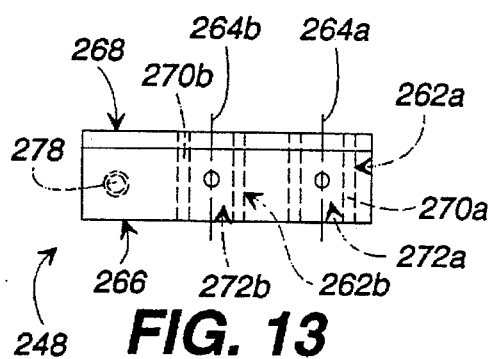
FIG. 13 is a top view of the mounting block of FIG. 12.
Figure 15:
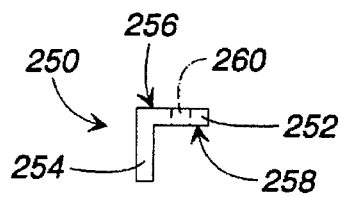
FIG. 15 is an end, elevational view of the lateral member of FIG. 14.

As seen in the front view of FIG. 1 and the exploded view of FIG. 5, the conveyor 60 comprises a front frame 82a and a laterally-opposed back frame 82b which is substantially similar to the front frame 82a. Each frame 82 includes an upper member 84 which is vertically-opposed to a lower member 86. The upper and lower members 84,86 extend longitudinally between the first and second ends 64,66 of the conveyor 60 and are manufactured, preferably, from square tube stainless steel. The upper and lower members 84,86 of each frame 82 are joined by an adjacent upright member 88 rigidly attached, preferably, by welding, near the first end 64 of the conveyor 60. The upright member 88 is, preferably, manufactured from stainless steel angle and defines holes 90. Each frame 82 further includes a tensioner bracket 92 which is rigidly attached, preferably, by welding, adjacent to the upper and lower members 84,86 near the second end 66 of the conveyor 60. Each tensioner bracket 92 is manufactured, preferably, from stainless steel and defines a longitudinally-extending cavity 94. Each frame 82 also includes a tensioner 96 manufactured, preferably, from stainless steel and having a tubular portion 98 and a flange portion 100 which defines holes 102. As shown in FIG. 5, the longitudinally-extending cavity 94 of the tensioner bracket 92 slidably receives the tubular portion 98 of the tensioner 96.

A pillow block bearing 104 is removably secured to each upright member 88 by bolts 106 which extend through holes defined by the bearings 104 and the holes 90 defined by the upright members 88. The pillow block bearings 104 receive a drive shaft 108 which extends rotatively between the pillow block bearings 104. The drive shaft 108 is, preferably, machined from stainless steel. Laterally-opposed sprockets 110 are adjustably secured in position about the drive shaft 108 and between the pillow block bearings 104 by stainless steel set collars 112. The drive shaft 108 further extends through pillow block bearing 104b and connects to a variable-speed, motor/gear box assembly 114 which is mounted to a pair of stainless steel members 115 extending laterally from upper member 84b.

Near the second end 64 of the conveyor 60, a flange bearing 116 is removably secured to each tensioner 96 by bolts (not visible) which extend through holes defined by the flange bearing 116 and the holes 102 defined by the flange portion 100 of the tensioners 96. Similar to the pillow block bearings 104 described above, the flange bearings 116 receive an idler shaft 118 which extends rotatively between the bearings 116. The idler shaft 118 is, preferably, machined from stainless steel and is received by laterally-opposed sprockets 120 which are adjustably secured to the idler shaft 118 by stainless steel set collars 122.

The conveyor 60 further comprises a continuous, interlocking conveyor belt 124 which partially encircles the sprockets 110, 120 while extending longitudinally between the first and second ends 64,66 of the conveyor 60. The conveyor belt 124 defines a moving bed 126 which extends laterally and adjacent to poultry guides 128. The poultry guides 128 are, preferably, manufactured from stainless steel and are each fixed to an upper member 84, preferably, by welding. The conveyor 60 also includes guide strips 130 which are removably secured atop support frame members 132 by clamps 134 (see FIG. 1). The guide strips 130 are manufactured, preferably, from wear-resistant plastic and have a, generally, "L"-shape lateral cross-section as seen in FIG. 5. The guide strips 130 extend longitudinally atop conveyor support members 132 and partially beneath the lower members 86 of the conveyor frames 82. A lock 136 releasably secures the lower members 86 of the conveyor flames 82 to the support frame members 132 (also referred to herein as conveyor support members). A handle 138 extends from the lower members 86 and enables a user to longitudinally slide the lower members 86 relative to the guide strips 130 and, hence, longitudinally slide the conveyor 60 relative to the skinning portion 54 of the poultry skinner 50 upon release of the lock 136.

Figure 4:
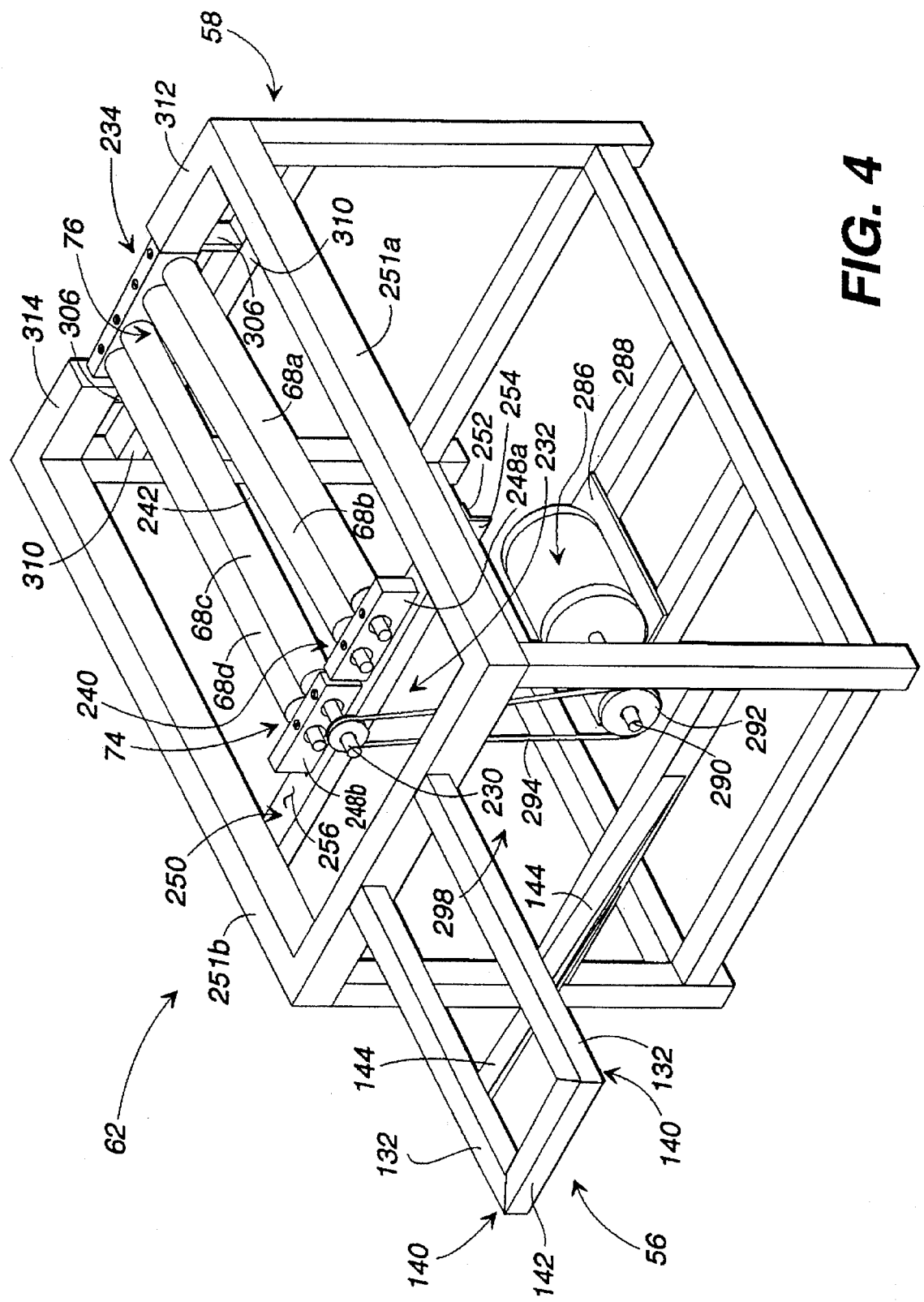
FIG. 4 is top, perspective view of the poultry skinner of FIG. 1 schematically displaying a support frame and plurality of elongated rollers.

The conveyor support members 132, comprising a portion of the support frame 62 seen in FIGS. 4 and 5, protrude longitudinally from the remainder of the support frame 62 in a direction toward the intake end 56 of the poultry skinner 50. The conveyor support members 132 are joined at ends 140 by a laterally-extending member 142 and are supported from below by angled members 144. A plate 146 is attached to the conveyor support members 132 and members 144 for receipt of a motor controller 148. Preferably, the support frame 62, except where noted, is manufactured from square tube stainless steel members which are rigidly joined by welding. As seen in FIGS. 1-3, the support frame 62 is enclosed by a from panel 150, back panel 152, and end panels 154,156. Panels 150,152,154,156 are, preferably, manufactured from stainless steel. Casters 158 extend from the support frame 62 to enable the support frame 62 and, hence, the entire poultry skinner 50 to be movable by a user.

Referring now to FIGS. 1-3 and FIGS. 6A and 6B, the front cover 70 of the skinning portion 54 rests atop the support frame 62 and extends longitudinally from the discharge end 58 of the poultry skinner 50 to a location proximate the second end 66 of the conveyor 60. The from cover 70 is, preferably, manufactured from stainless steel and has a front panel 160, a top panel 162, opposed end panels 164, 166, and trough panel 168. The front panel 160 includes a lip 172 which extends laterally from the from of the poultry skinner 50 and longitudinally between the end panels 164, 166. Hinges 174 are interposed between the from panel 160 and the support frame 62. A handle 176 is attached to the top panel 162 and, in conjunction with the hinges 174, enables a user to rotate the front cover 70 about the hinges 174 to better expose the elongated rollers 68 for cleaning and other maintenance. The lip 172 contacts front panel 150 when the front cover 70 is rotated fully about the hinges 174 by a user. The trough panel 168 partially defines the trough 69 which funnels downward to the elongated rollers 68 and has a first portion 177 and a second portion 178 (seen best in FIG. 6B). The first portion 177 of the trough panel 168 extends longitudinally between the end panels 164, 166 and slopes inward and downward toward the elongated rollers 68. The second portion 178 of the trough panel 168 has a, generally, tapered shape and bends vertically downward from the first portion 177 of the trough panel 168 near the discharge end 58 of the poultry skinner 50. Together, the first and second portions 177,178 of the trough panel 168 define an edge 180 which extends longitudinally between the cover end panels 164, 166 and adjacent to the elongated rollers 68 following the, generally, downward slope angle, α, of the elongated rollers 68 toward the discharge end 58.

The back cover 72 of the skinning portion 54 is substantially similar to the front cover 70 and is, therefore, not discussed herein except to note that the back cover 72 does not include a handle 176 like that of the front cover 70. In addition to being hingedly connected to the support frame 62, the back cover 72 is hingedly connected to a top cover 182 which is, preferably, manufactured from stainless steel. The top cover 182 has ends 184,186 and comprises a top panel 188, a front panel 190, and a back panel 192 (see FIG. 6). The top panel 188 has an inside surface 194 and defines an aperture 196. A water rail 198 mounts adjacent to inside surface 194 and has an inlet fitting 200 which extends through aperture 196 (see FIGS. 1 and 3). The water rail 198 extends longitudinally toward the ends 184, 186 of the top cover 182 and receives a plurality of spraying nozzles 202 and a shower head 204. The front and back panels 190,192 of the top cover 182 extend vertically downward from the top panel 188 and have a, generally, tapered shape. The front and back panels 190, 192 extend longitudinally between the top cover's ends 184, 186 and each panel 190, 192 has a lip 206,208, respectively, which extends laterally inward to oppose inside surface 194. A handle 210, fixedly attached to the front panel 190 enables a user to rotate the top cover 182 about its hinges. When the poultry skinner 50 is in use, the top cover 182 is positioned above the elongated rollers 68 with lips 206,208 contacting the front and back covers 70,72, respectively, as shown in FIG. 2. When the poultry skinner 50 is not in use, the top cover 182 may be positioned with the back panel 192 contacting the back cover 72 as illustrated in FIG. 3.

In accordance with the preferred embodiments of the present invention, the skinning portion 54 of the poultry skinner 50 includes, as displayed in FIGS. 3 and 4, at least four elongated rollers 68. It is believed that the use of four elongated rollers 68 results in optimum skin removal with the two inner rollers 68b,c cooperating to perform the majority of skin removal, while the two outer rollers 68a,d cooperate with the two inner rollers 68b,c, respectively, to aid in disposal of the removed skin. It is understood that the inclusion of a greater or lesser number of elongated rollers 68 is considered to be within the scope of the present invention. As seen in the isolated views of FIGS. 7-8, each elongated roller 68 comprises a, generally, cylindrical core portion 212 having a length, "A", and a diameter, "B", which extends between the first and second ends 74,76 of the roller 68 about a longitudinal axis 214. A plurality of elongated teeth 216 extend radially from the core portion 212 and spiral about the core portion 212, generally, between the first and second ends 74,76 to form a helix angle, β, with the longitudinal axis 214. Each tooth 216 has a top surface 218, having a width, "C", and opposed faces 220,222 which extend radially from the core portion 212 for a distance, "D", to define edges 224,226, respectively, with the top surface 218. The faces 220,222 of adjacent teeth 216 define spaces 228 which, like the teeth 216, spiral about the core portion 212, generally, between the first and second ends 74,76. As seen in FIG. 7, a first shaft 230, having a diameter, "E", protrudes longitudinally from the core portion 212 at the first end 74 of each elongated roller 68.

Preferably, the elongated rollers 68 are machined from stainless steel rod and have the following specifications: core portion length, "A", of 28 inches; core portion diameter, "B", of 1.343 inches; helix angle, "β" of 17 degrees; number of teeth, "F", of 18; tooth width, "C", of 0.11 inches; tooth height, "D", of 0.204 inches; and, shaft diameter, "E", of 0.75 inches. Note that the core portion diameter, "B", when combined with the tooth height, "D", yields an outside diameter, "G", for each elongated roller 68 of 1.75 inches. Also, note that numbers of teeth, "F", ranging between 16 and 26 and outside diameters, "G", ranging between 1.5 and 2.25 inches are considered acceptable. It is believed that employment of lesser numbers of teeth, "F", results in less efficient skin removal, while employment of greater numbers of teeth, "F", results in more efficient skin removal.

The elongated rollers 68, in accordance with the preferred embodiments of the present invention, are mounted between first and second mounting assemblies 232,234 which allow the rollers 68 to rotate relative to the support frame 62 (see FIG. 4). The first mounting assembly 232 rotatively receives the first ends 74 of the elongated rollers 68 and positions the first ends 74 near the second end 66 of the conveyor 60 (see FIG. 3). The second mounting assembly 234 rotatively receives the second ends 76 of the elongated rollers 68 and positions the second ends 76 near the discharge end 58 of the poultry skinner 50. In conjunction, the first and second mounting assemblies 232,234 position each elongated roller 68 to reside, generally, adjacent to another elongated roller 68 in a common plane 236 which passes through the longitudinal axis 214 of each elongated roller 68 (see FIG. 1). The first mounting assembly 232 is located above the second mounting assembly 234, thereby causing the elongated rollers 68 slope downward toward the discharge end 58 to define the slope angle, α, between the common plane 236 of the elongated rollers 68 and a horizontal plane 238 (see FIG. 1). Preferably, the slope angle, α, has a value of 5 degrees, but values in the range of 3 to 11 degrees are acceptable. Note that use of slope angles, α, less than 5 degrees decreases the rate at which the poultry travels toward the discharge end 58 of the poultry skinner 50. It is believed that use of slope angles, α, less than 3 degrees may result in dramatically reduced processing throughput and may cause damage to the membrane located immediately below the skin of the poultry. Note also that use of slope angles, α, greater than 5 degrees increases the rate at which the poultry travels toward the discharge end 58 of the poultry skinner 50. It is believed that use of slope angles, α, greater than 11 degrees may result in dramatically increased processing throughput, but may cause the poultry skinner 50 to fail to remove portions of the poultry skin.

The first and second mounting assemblies 232,234 also position elongated roller 68c and elongated roller 68b to define a gap 240 (also referred to herein as a pinch gap 240) between the rollers 68b,c. The gap 240, shown in FIGS. 4, 10, 20, 28, 34, and 39 in exaggerated form for clarity, is a tapered area lying in the common plane 236 of the elongated rollers 68 and extends from its widest point at the first ends 74 of elongated rollers 68b,c to an endpoint 242 located distant from the first ends 74 of the rollers 68b,c. During operation, the gap 240 prevents contact between elongated rollers 68b,c at their first ends 74, but allows progressively more engagement of the teeth 212 and spaces 228 of elongated rollers 68b,c as the gap 240 tapers toward endpoint 242. Between endpoint 242 and the second ends 76 of the rollers 68b,c, the teeth 212 and spaces 228 of elongated roller 68b mesh with the spaces 228 and teeth 212 of elongated roller 68c, thereby imparting the rotation of elongated roller 68c, as discussed below, to elongated roller 68b. In accordance with the preferred embodiments, a gap width, "H", is defined as the distance between the top surfaces 218 of opposing teeth 212 of elongated rollers 68b,c at a location 0.75 inches from the first ends 74 of the rollers 68b,c. Preferably, the gap width, "H", is set to a value of 0.0625 inches, but other values in the range between 0.0156 and 0.1875 inches are acceptable. It is believed that, during operation, the gap 240 enables poultry to instantaneously become lodged between elongated rollers 68b,c, thereby allowing the teeth 212 of the rollers 68b,c to better initially engage the skin of the poultry.

Figure 11:
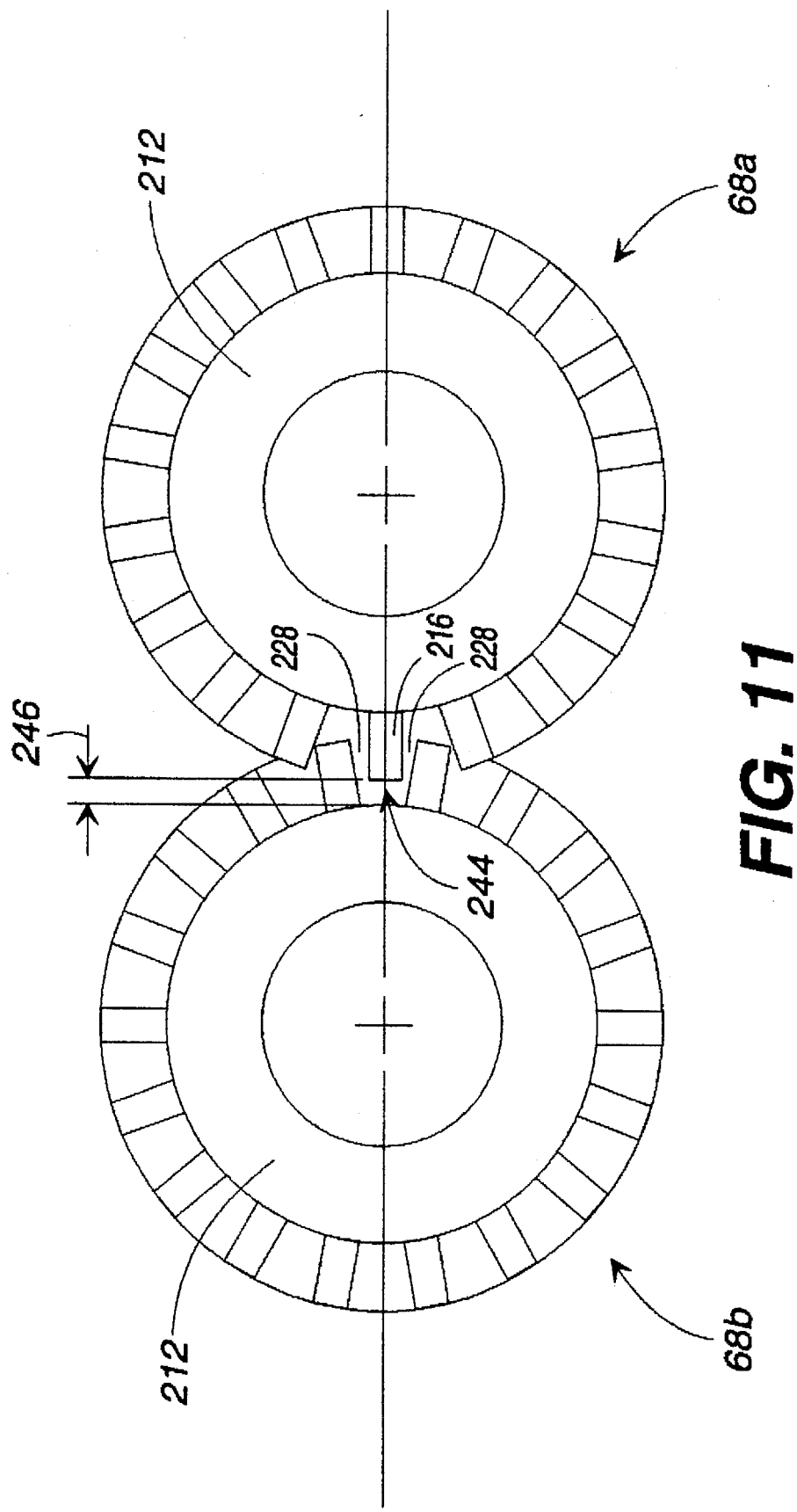
FIG. 11 is a schematic, end, elevational view of a pair of meshing elongated rollers of the poultry skinner of FIG. 1.

In accordance with the preferred embodiments of the present invention, the first and second mounting assemblies 232,234 further position the teeth 216 and spaces 228 of elongated roller 68c to repeatedly mesh along their entire length with the spaces 228 and teeth 216 of elongated roller 68d when the first shaft 230 of elongated roller 68c is rotated during operation by the motor/gearbox unit 240. Similarly, the teeth 216 and spaces 228 of elongated roller 68a are positioned, by the first and second mounting assemblies 232,234, to repeatedly mesh along their entire length with the spaces 228 and teeth 216 of elongated roller 68b when rotated during operation. FIG. 11 schematically displays the typical meshing between any two elongated rollers 68 which mesh (i.e, elongated rollers 68a and 68b, elongated rollers 68c and 68d, and elongated rollers 68b and 68c between gap endpoint 242 and their second ends 76), but for illustration purposes, FIG. 11 employs elongated rollers 68a,b. As seen in FIG. 11, a meshing tooth 216 and space 228 of elongated rollers 68a,b, respectively, define a gap 244 between the tooth 216 of roller 68a and the core portion 212 of elongated roller 68b. The gap 244 provides a clearance 246 defined as the distance between the tooth 216 of elongated roller 68a and the core portion 212 of elongated roller 68b as measured along a line joining the centers of the elongated rollers 68a,b. Preferably, the clearance 246 has a value of 0.001 inches. It is believed that a properly selected value of clearance 246 limits binding between the meshing elongated rollers 68 and enables a meshing tooth 216 and space 228 to emulsify skin which becomes trapped in the gap 244.

Referring now to FIGS. 4, 10, and 12–15, the first mounting assembly 232 comprises first and second mounting blocks 248a,b and a lateral member 250 which is rigidly attached, preferably, by welding, to support frame members 251a,b. Preferably, the lateral member 250 is manufactured from stainless steel angle and is oriented so that a first leg 252 points toward the discharge end 58 of the poultry skinner 50, while a second leg 254 points downward. The first leg 252 has a top surface 256 and a bottom surface 258. Slots 260 extend laterally in the direction defined by the front 259 and back 261 of the poultry skinner 50 (see FIG.

3) and vertically between the top and bottom surfaces 256,258 of the first leg 252. The first and second mounting blocks 248 are, preferably, also manufactured from stainless steel and are substantially similar. Therefore, in the discussion that follows, only one mounting block 248 is described, but it is understood that the description applies equally to both mounting blocks 248a,b. The mounting block 248 defines first and second bores 262a,b which extend radially about centerlines 264a,b and longitudinally between a front 266 and back 268 of the mounting block 248. The first and second bores 262a,b receive bushings 270a,b, respectively, which extend between the front 266 and back 268 of the mounting block 248. The bushings 270a,b define radial passages 272a,b about centerlines 264a,b, respectively. Third and fourth bores 274a,b extend between a top 276 of the mounting block 248 and the first and second bores 262a,b, respectively, to enable lubrication of the bushings 270a,b. A threaded bore 278 extends partially into the mounting block 248 from a bottom 280 to enable adjustable securing of the block 248 to the lateral member 250.

Figure 16:
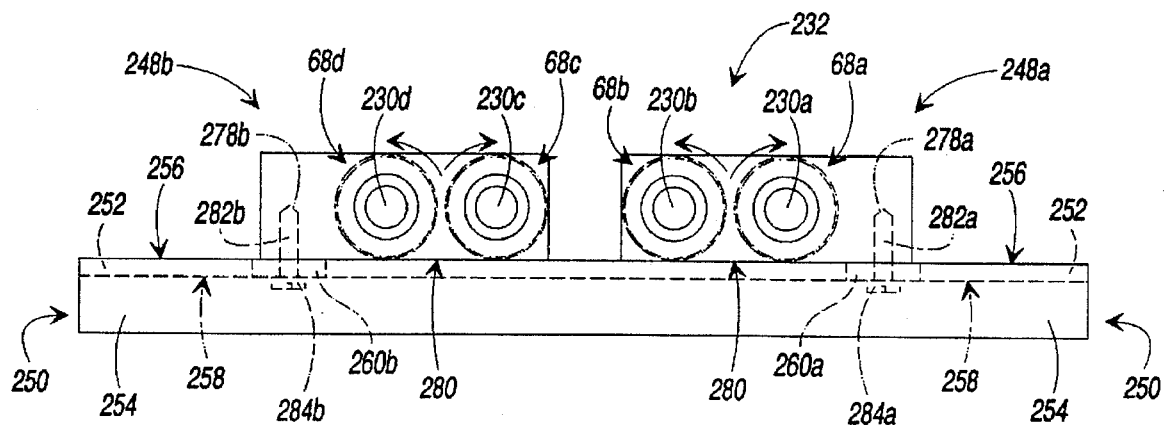
FIG. 16 is an end, elevational view of the first mounting assembly of FIG. 10.

The mounting blocks 248a,b are adjustably positioned above the lateral member 250, as illustrated in FIG. 16, with the bottom 280 of each block 248a,b resting against the top surface 256 of the lateral member 250. The first mounting block 248a receives the first shafts 230a,b of elongated rollers 68a,b and the second mounting block 248b receives the first shafts 230a,b of elongated rollers 68c,d. Bolts 282a,b, having heads 284a,b, extend through slots 260a,b and into threaded bores 278a,b, respectively. The bolt heads 284a,b rest against the bottom surface 258 of the lateral member 250 to secure the mounting blocks 248a,b in position. Note that the lateral position of each mounting block 248 relative to the support frame members 251a,b and to the other mounting block 248 is independently adjustable by the interaction between the laterally extending slots 260 and the mounting blocks 248. Note also that the lateral position of mounting block 248a to mounting block 248b determines the width of gap 240, discussed above, which is adjustable by virtue of the independently adjustable lateral position of each mounting block 248.

Referring momentarily to FIG. 4, a conventional motor/gearbox unit 286 resides below the mounting blocks 248 and elongated rollers 68. The motor/gearbox unit 286 is removably mounted to a plate 288 which is rigidly attached to the support frame 62, preferably, by welding. The motor/gearbox unit 286 has a shaft 290 which extends longitudinally toward the intake end 56 of the poultry skinner 50 and into connection with a first sprocket 292. A chain 294 partially encircles the first sprocket 292 and extends upward to partially encircle a second sprocket 296 which connectedly receives the first shaft 230 protruding from elongated roller 68c. Collectively, the first and second sprockets 292, 296 and chain 294 form a drive train 298 which, in conjunction with the motor/gearbox unit 286, causes clockwise rotation of elongated roller 68c (as seen viewing from the intake end 56 toward the discharge end 58) and subsequent counterclockwise rotation of elongated roller 68b during operation of the poultry skinner 50 (see FIG. 16). The clockwise rotation of inner elongated roller 68c causes counterclockwise rotation of adjacent meshing outer elongated roller 68d. Similarly, the counterclockwise rotation of inner elongated roller 68b causes clockwise rotation of adjacent meshing outer elongated roller 68a. It is believed that the opposite rotation of inner elongated rollers 68b,c tends to cause the poultry's skin to be grasped and pulled downward between the rollers 68b,c. Preferably, the motor/gearbox unit 286 and drive train 298 rotate elongated roller 68c at a speed of 175 revolutions per minute (RPM), but speeds in the range between 140 and 225 RPM are considered acceptable. It is believed that speeds slower than 175 RPM cause the poultry to travel slower between the first and second ends 74, 76 of the elongated rollers 68, thereby resulting in increased contact time with the rollers 68. Note that increased contact time can result in more effective skin removal, but too much contact time can result in damage to the membrane located immediately beneath the poultry skin. It is further believed that speeds faster than 175 RPM cause the poultry to travel faster between the first and second ends 74, 76 of the elongated rollers 68, thereby resulting in decreased contact time with the rollers 68. Note that decreased contact time can produce greater throughput, but may result in less effective skin removal.

Figure 17:
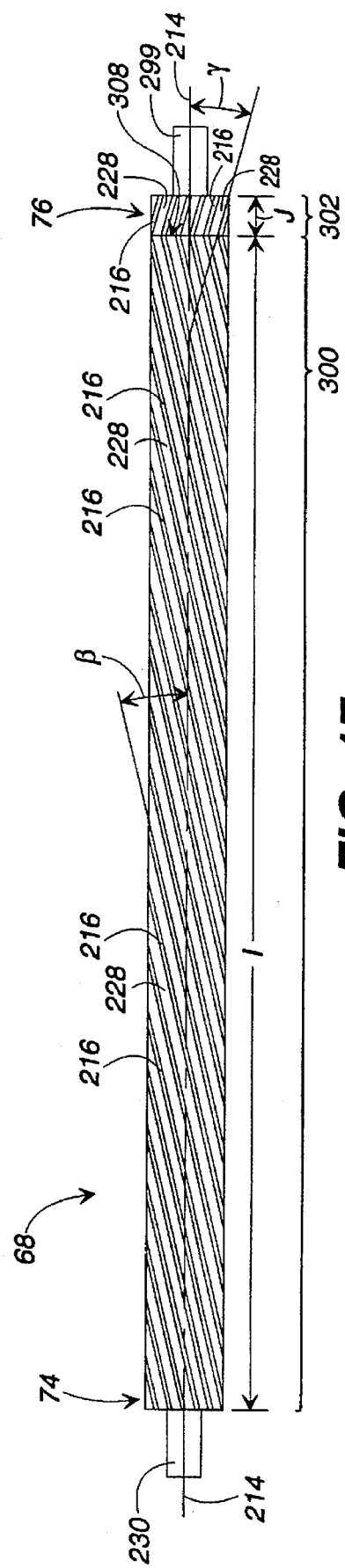
FIG. 17 is a schematic, top view of an elongated roller a poultry skinner in accordance with a first preferred embodiment of the present invention.
Figure 19:
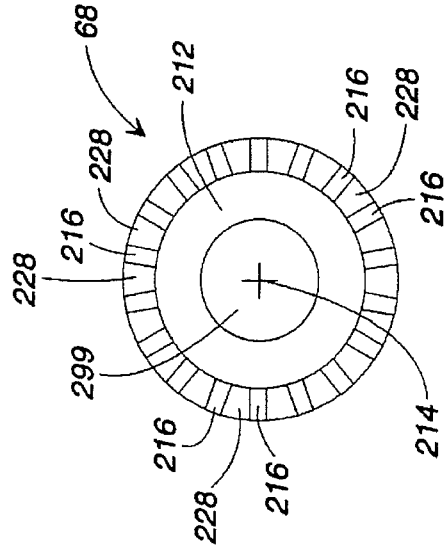
FIG. 19 is a schematic, end, elevational view of the elongated roller of FIG. 17 taken from a second end.
Figure 18:
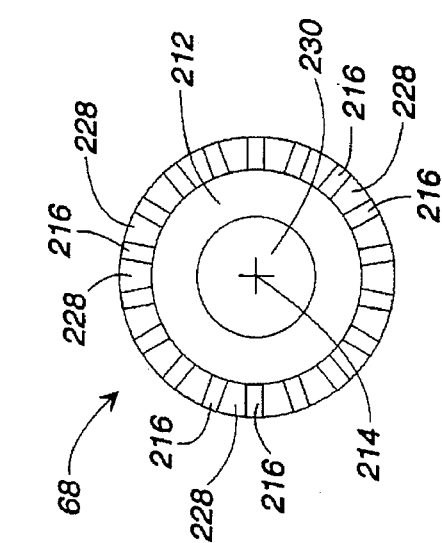
FIG. 18 is a schematic, end, elevational view of the elongated roller of FIG. 17 taken from a first end.
Figure 39:
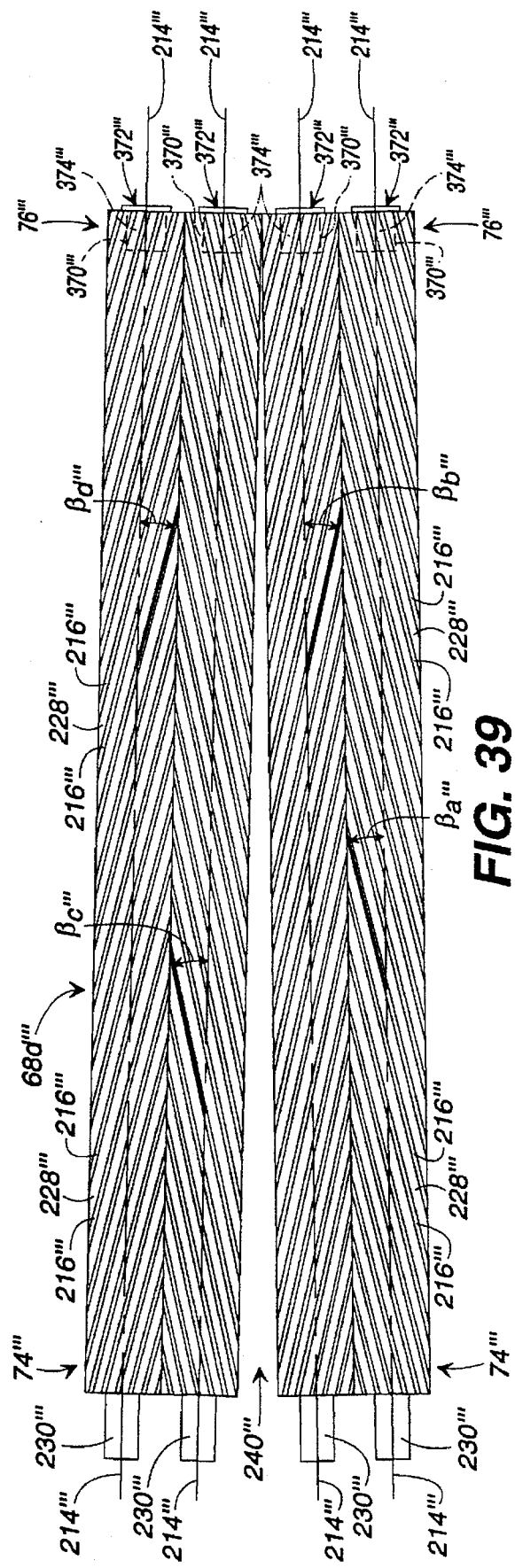
FIG. 39 is a schematic, top view of a plurality of elongated rollers of a poultry skinner in accordance with the fourth preferred embodiment of the present invention.
Figure 40:
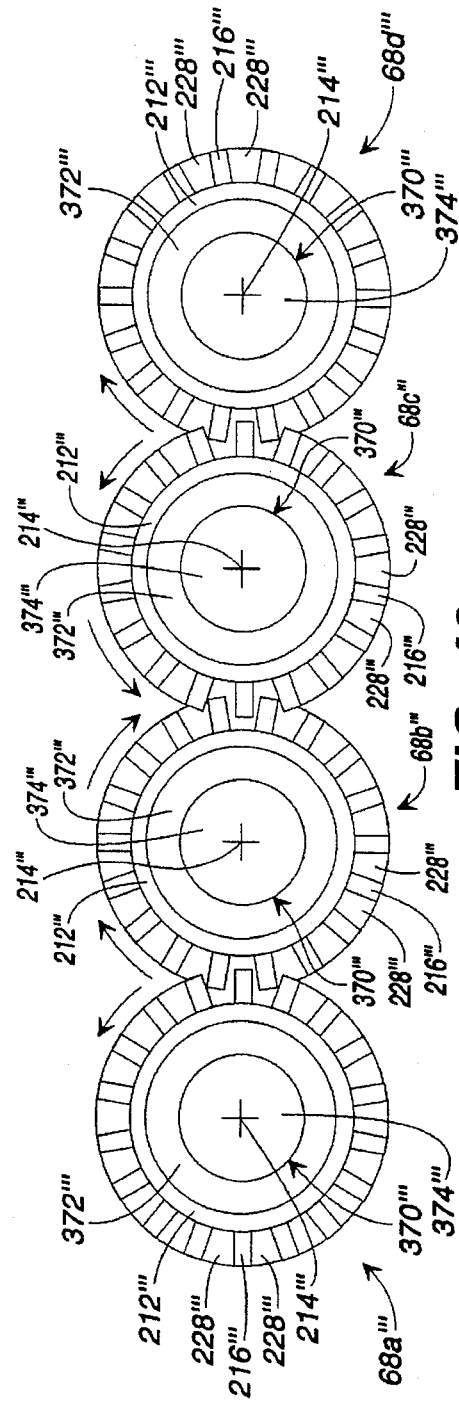
FIG. 40 is a schematic, end, elevational view of the plurality of elongated rollers of FIG. 39 taken from the second end.

FIGS. 17–19 display an isolated elongated roller 68, in accordance with the first preferred embodiment of the present invention, and was partially described above. Note that the elongated roller 68 includes a second shaft 299 extending longitudinally from the second end 76 of the roller 68. Note also that the elongated roller 68 defines a first plurality of teeth and spaces 300 (also referred to herein as a first segment of teeth and spaces 300) having a first helix angle, $\beta$, above the longitudinal axis 214 (as seen in the top view of FIG. 17) and a second plurality of teeth and spaces 302 defining a second helix angle, $\gamma$, oriented opposite the first helix angle, $\beta$, below the longitudinal axis 214. The second plurality of teeth and spaces 302 is also referred to herein as a "reversed" segment 302 because the helix angle, $\gamma$, of its teeth 216 and spaces 228 is opposite or "reverse" to the helix angle, $\beta$, of the first plurality of teeth and spaces 300 when viewed relative the longitudinal axis 214. Preferably, the first and second helix angles, $\beta,\gamma$, have equal values which, preferably, measure 12.5 degrees. The first plurality of teeth and spaces 302 extends from the first end 74 of the elongated roller 68 toward the second end 76 of the elongated roller 68 for a distance, "I", to an end 308. The second plurality of teeth and spaces 302 extends from end 308, for a distance, "J", to the second end 76 of the elongated roller 68. Preferably, distance, "I", measures 27 inches and distance, "J" measures 1 inch. It is believed that the "reversed" orientation of the second plurality of teeth and spaces 302 relative to those of the first plurality 300 aids in removing skin, which typically becomes embedded in the spaces 228 of the elongated rollers 68.

FIGS. 20 and 21 illustrate, by isolation from the remainder of the poultry skinner 50, the relative orientation and relationship between the elongated rollers 68 in accordance with the first preferred embodiment. The elongated rollers 68 are positioned in pairs with a portion of the teeth 216 and spaces 228 of elongated rollers 68a,68b intermeshing between ends 74,76 and a portion of the teeth 216 and spaces 228 of elongated rollers 68c,68d similarly intermeshing between ends 74,76. The pinch gap 240 is seen, in exaggerated fashion, extending between the pairs of elongated rollers 68. Note that the first helix angles, $\beta_b,\beta_c$, and the second helix angles, $\gamma_a,\gamma_b$, of elongated rollers 68b,68c, respectively, are oriented toward opposite sides of their longitudinal axes 214 as viewed in the top view of FIG. 20. Similarly, the first helix angles, $\beta_a,\beta_b$ and $\beta_c,\beta_d$, and the second helix angles, $\gamma_a,\gamma_b$ and $\gamma_c,\gamma_d$, of the pairs of elongated rollers, 68a,68b and 68c,68d, respectively, are oriented toward opposite sides of their longitudinal axes 214. FIG. 21 displays the relative rotational directions of the elongated rollers 68 as viewed from the discharge end 58 looking back toward the intake end 56. It is believed that the opposite rotational direction of outer elongated roller 68a to inner elongated roller 68b and the opposite rotational direction of outer elongated roller 68d to inner elongated roller 68c aids in dislodging removed skin which tends to adhere to the inner elongated rollers 68b,68c. The dislodged skin is then carried by the rotation of the outer elongated rollers 68a,68d away from the inner elongated rollers 68b,68c for release into the second discharge chute 80 extending below the elongated rollers 68.

Figure 22:
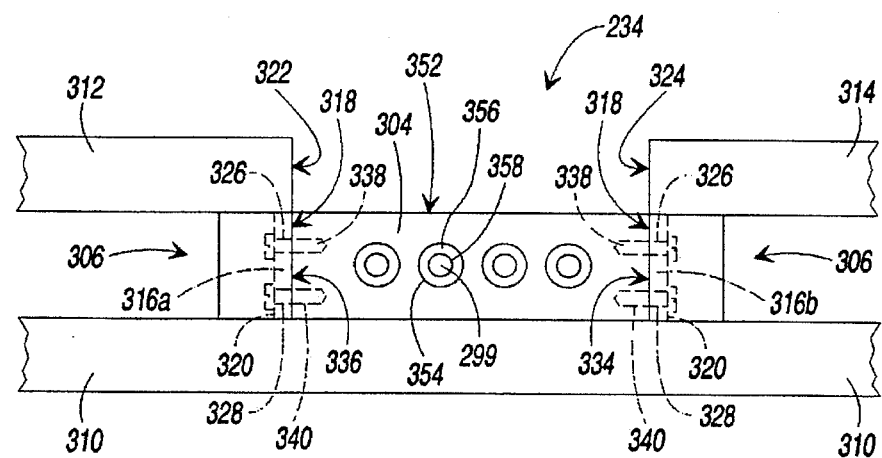
FIG. 22 is a partial schematic, end, elevational view of a second mounting assembly of a poultry skinner in accordance with the first preferred embodiment of the present invention.
Figure 23:
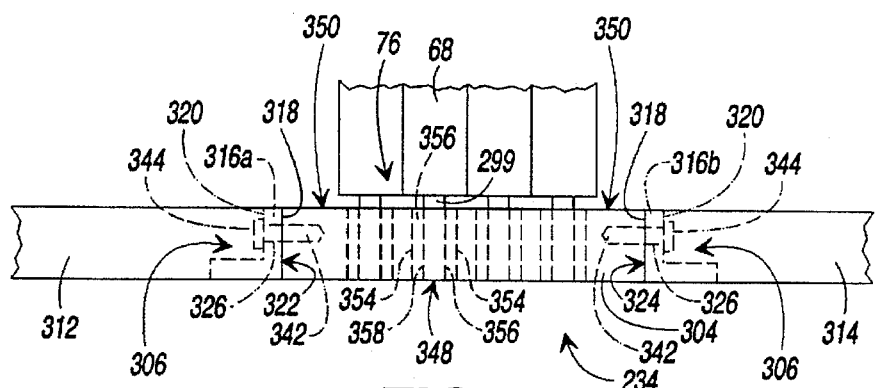
FIG. 23 is a partial schematic, top view of the second mounting assembly of FIG. 22.

In accordance with the first preferred embodiment of the present invention and as displayed in FIGS. 22 and 23, the second mounting assembly 234 is located at the discharge end 58 of the poultry skinner 50. The second mounting assembly 234 comprises a third mounting block 304 and vertical members 306 which extend between support frame members 310,312 and support frame members 310,3 14, respectively. The vertical members 306 are, preferably, manufactured from stainless steel angle and are rigidly attached, preferably, by welding, to the support frame members 310,312,314. Each vertical member 306 includes a first leg 316 having an inner surface 318 and an outer surface 320. The inner surfaces 318 of legs 316 are aligned in a vertical plane with vertical ends 322,324 of support frame members 312,3 14, respectively. Each leg 316 defines first and second holes 326,328 which extend laterally between the inner and outer surfaces 318,320.

The third mounting block 304 is, preferably, manufactured from stainless steel and is removably mounted between the vertical members 306. The third mounting block 304 includes a right side 334 and a left side 336 which abut the inner surfaces 318 of vertical member legs 316a,b, respectively. First and second threaded bores 338,340 extend partially into the third mounting block 304 from the right and left sides 334,336. The first threaded bores 338 align axially with the first holes 326 and the second threaded bores 340 align axially with the second holes 328. Bolts 342, having heads 344, extend through the first and second holes 326,328 in vertical member legs 316 and into the first and second threaded bores 338,340 of the third mounting block 304. The heads 344 rest against the outer surfaces 320 of the legs 316 to secure the third mounting block 304. The third mounting block 304 also includes a bottom 346 which rests atop support frame member 310.

As seen in FIGS. 22 and 23, the third mounting block 304 further comprises a front 348, back 350, and top 352. Radial bores 354 extend between the front 348 and back 350 of the third mounting block 304. Each radial bore 354 receives a bushing 356 which defines a passageway 358 extending between the front 348 and back 350. Each passageway 358 receives a second shaft 299 of an elongated roller 68 and adjacently positions the second ends 76 of the rollers 68 to enable meshing of the teeth 216 and spaces 228 as shown in FIGS. 20 and 21, thereby transferring the rotation of elongated roller 68c to the other rollers 68a,b,d during operation. Note that the third mounting block 304 also defines bores 360 which each extend between the top 352 of the block 304 and a radial bore 354. Bores 360 enable lubrication of the bushings 356.

In accordance with a second preferred embodiment of the present invention, the poultry skinner 50' is substantially similar to the poultry skinner 50 of the first preferred embodiment, but includes inner elongated rollers 68' as shown in FIGS. 24–27. Note that a flat surface 362' is defined at a position laterally offset from the longitudinal axis 214' to form a chord 363' of the elongated roller 68'. The flat surface 362' extends between end 308' and the second end 76' of the elongated roller 68' to define a width, "J", which is, preferably, 1 inch. The flat surface 362' has a top edge 365' and an opposed bottom edge 367' which are formed by the intersection of the teeth 216' and spaces 228' of the second plurality of teeth and spaces 302' and the flat surface 362'. Preferably, the flat surface 362' is formed by "machining down" portions of the teeth 216' of the second plurality of teeth and spaces 302'. As seen in the side and sectional views of FIGS. 25 and 27, respectively, the flat surface 362' has a, generally, rectangular shape. It is understood that the scope of the present invention includes elongated rollers 68' which comprise other flat-like surfaces having different shapes and sizes.

FIGS. 28 and 29 schematically illustrate the orientation and relationship between the flat surfaces 362b',362c' of the inner elongated rollers 68b',68c', respectively, in accordance with the second preferred embodiment at a point in time. As seen best in the sectional view of FIG. 29, the flat surface 362b' of elongated roller 68b' is vertically adjacent to and opposes the flat surface 362c' of elongated roller 68c'. The flat surfaces 362b',362c' define a gap 369' between the elongated rollers 68b',68c'. It is believed that the gap 369' reduces clogging of the rollers 68', during operation, by enabling removed poultry skin to fall downward between the flat surfaces 362' whenever they are opposed. Note that the flat surfaces 362b',362c' are vertically opposed one time per rotation of each elongated roller 68b',68c'.

In accordance with a third preferred embodiment of the present invention, the poultry skinner 50" is substantially similar to the poultry skinners 50,50' of the first and second preferred embodiments, but includes elongated rollers 68" as shown in FIGS. 30–35. Note that the first plurality of teeth and spaces 300" of each elongated roller 68" includes a third plurality of teeth and spaces 364" defining a third helix angle, δ". Preferably, the third helix angle, δ", is oriented relative to the longitudinal axis 214" like the second helix angle, γ", defined by the second plurality of teeth and spaces 302". Also, the third helix angle, δ", preferably, has the same measure as the second helix angle, β". The third plurality of teeth and spaces 364", also referred to herein as a second "reversed segment" 364" (i.e., the first "reversed segment" 302" being the second plurality of teeth and spaces 302"), has a first end 366" which is positioned at a distance, "K", from the first end 74 of the elongated rollers 68" The third plurality of teeth and spaces 364" extends longitudinally toward the second end 76 of the elongated rollers 68" to a second end 368" which is located at a distance, "L", (also referred to as the second segment's "length") from the first end 366". Preferably, the segment's position, "K", is 6 inches from the first end 74 of the elongated rollers 68" and the segment's length, "L", is 1 inch. It is believed that inclusion of the second reversed segment 364" enhances skin removal by better enabling the elongated rollers 68" to better engage the skin of the poultry.

Figure 41:
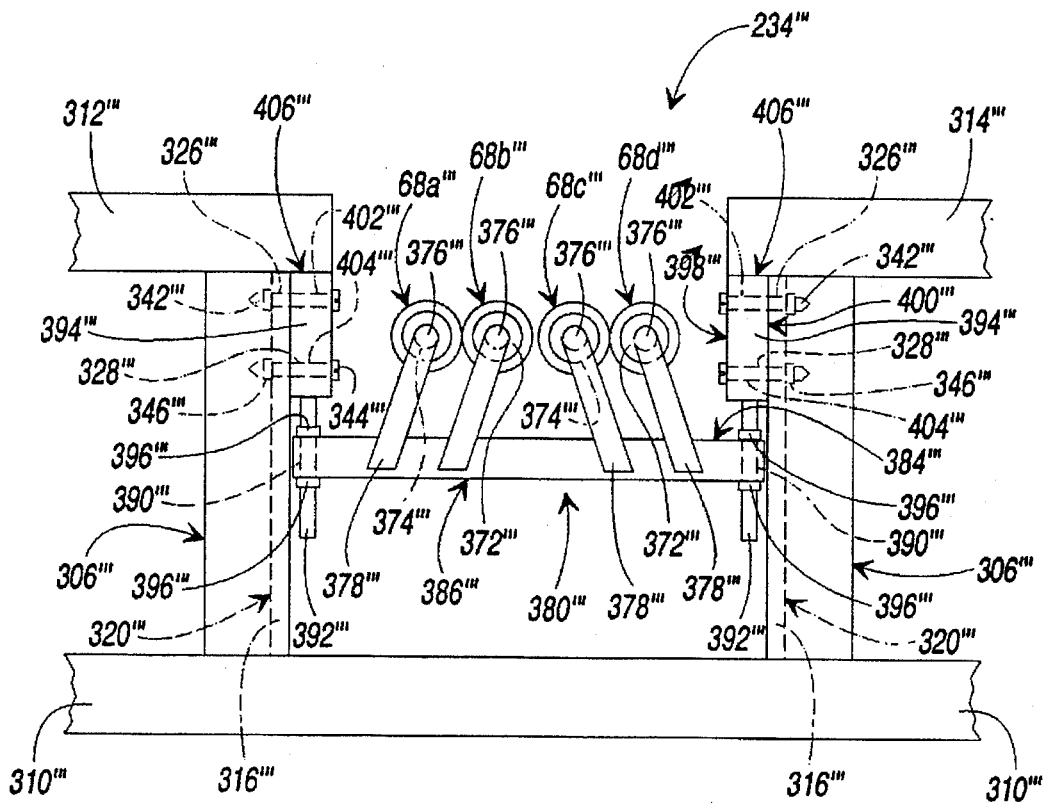
FIG. 41 is a partial schematic, end, elevational view of a second mounting assembly in accordance with the fourth preferred embodiment of the present invention.
Figure 42:
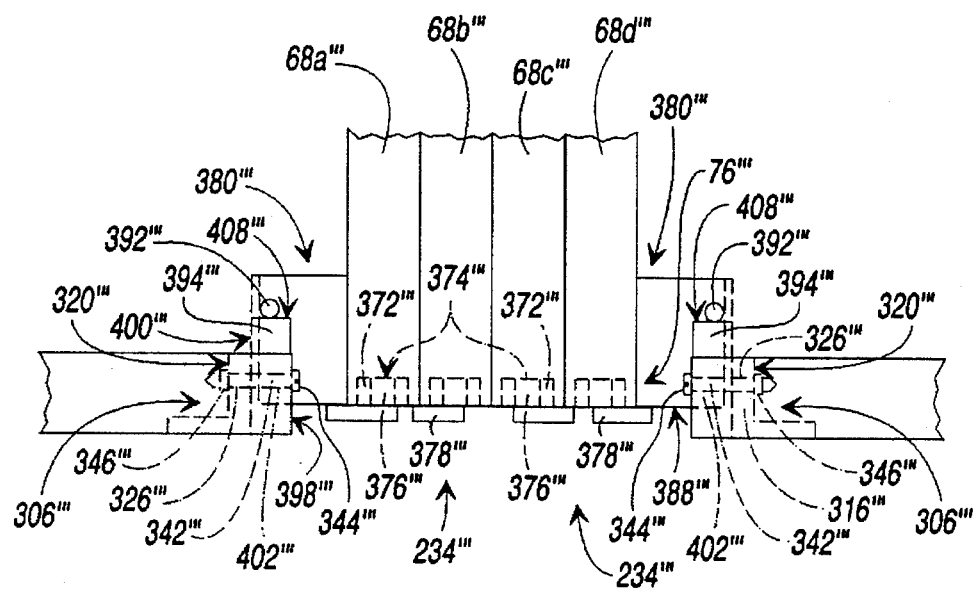
FIG. 42 is a partial, top view of the second mounting assembly of FIG. 41.

In accordance with a fourth preferred embodiment of the present invention, the poultry skinner 50'" is substantially similar to the poultry skinner 50 of the first preferred embodiment, but includes elongated rollers 68'", as shown in FIGS. 36–40, and an adjustable second mounting assembly 234'", as seen in FIGS. 41 and 42. Each elongated roller 68'" includes a plurality of teeth 216'" and spaces 228'" which extend spirally about the core portion 212'" of the roller 68'"between the first and second ends 74'",76'". The teeth 216'" and spaces 228'" define a helix angle, β'", similar to the teeth 216 and spaces 228 of the elongated rollers 68 of the first preferred embodiment. The elongated rollers 68'" further include a bore 370'" which extends radially about the longitudinal axis 214'" and longitudinally partially into the core portions 212'" from the second end 76" of the rollers

68′″. Each bore 370′″ receives a bushing 372′″ which defines a cavity 374′″ for receipt of a rod 376′″ as discussed below (see FIGS. 41 and 42).

The second mounting assembly 234′″, in accordance with the fourth preferred embodiment and displayed in FIGS. 41 and 42, is manufactured, preferably, from stainless steel components and is removably mounted between vertical members 306′″. The second mounting assembly 234′″ comprises a plurality of rods 376′″ which each extend longitudinally from the cavity 374′″ of an elongated roller's bushing 372′″, thereby enabling each elongated roller 68′″ to rotate relative to a rod 376′″. Each rod 376′″ is rigidly attached, preferably, by welding, to a bar 378′″ which extends angularly downward to a base 380′″ The base 380′″ resides, generally, between the vertical members 306′″ and has a top surface 384′″, a bottom surface 386′″, and a front 388′″. Each bar 378′″ is attached, preferably, by welding, to the front 388′″ of the base 380′″. Holes 390′″ extend between the top and bottom surfaces 384′″,386′″ of the base 380′″ and receive threaded rods 392′″ which extend vertically downward from blocks 394′″. Nuts 396′″ receive the threaded rods 392′″ and are positioned in contact with the top and bottom surfaces 384′″,386′″ of the base 380′″ to secure the base 380′″ and, hence, the second ends 76′″ of the elongated rollers 68′″ at a desired vertical position. Note that adjustment of the location of the nuts 396′″ along the threaded rods 392′″ enables adjustment of the vertical position of the base 380′″ and the second ends 76′″ of the elongated rollers 68′″, thereby enabling adjustment of the slope angle, $\alpha$, of the elongated rollers 68′″.

Each threaded rod 392′″ is rigidly attached, preferably, by welding, to a block 394′″ which is removably mounted to a vertical member 306′″. Each block 394′″ has an inner side 398′″ and an outer side 400′″ which resides adjacent to a leg 316′″ of a vertical support member 306′″. The inner and outer sides 398′″,400′″ define holes 402′″,404′″ which extend between the sides 398′″,400′″. Each block 394′″ also has a top 406′″, which resides adjacent to and below a support frame member 312′″,314′″, and a back 408′″ which attaches to a threaded rod 392′″. Holes 402′″,404′″ align axially with holes 326′″,328′″ defined by a first leg 316′″ of each vertical member 306′″. Bolts, 342′″, having heads 344′″, extend through holes 402′″,404′″ and holes 326′″,328′″, respectively, and through nuts 346′″. Bolt heads 344′″ reside adjacent to the inner sides 398′″ of the blocks 394′″ and nuts 346′″ reside adjacent to the outer surfaces 320′″ of the first legs 316′″ to secure the blocks 394′″ in place.

Figure 43:
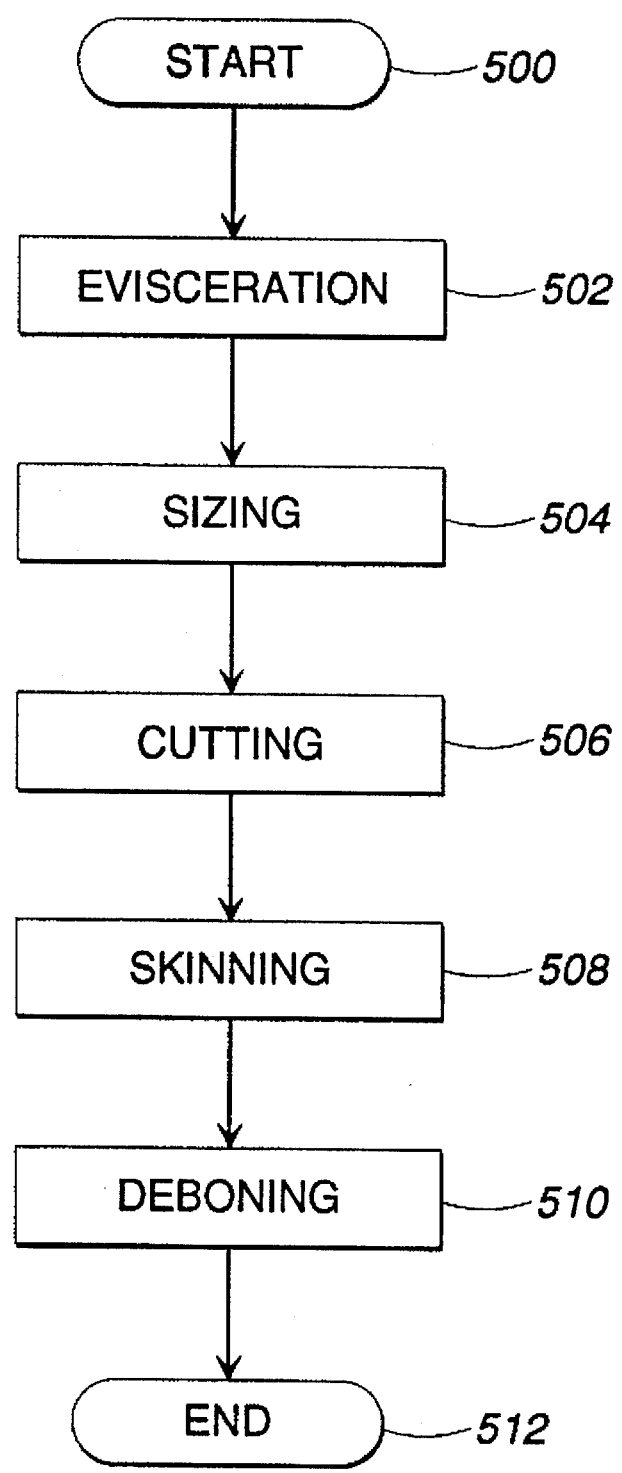
FIG. 43 is a flowchart representation of the steps of a first preferred method of the present invention.

FIG. 43 displays the steps of a first preferred method of the present invention. Note that the steps are, preferably, performed in a sequential, continuous manner employing assembly line processing equipment, thereby limiting any processing delays to those encountered while transporting a poultry fowl (or poultry fowl portion) between the equipment employed to execute the steps. The method begins at step 500 and proceeds to step 502 where the body of a chicken, turkey, or other poultry fowl, having been previously killed, is eviscerated to remove the internal organs. After evisceration, the method continues, at step 504, where the body of the poultry fowl is "sized" (i.e., weighed) and routed, based upon its size (i.e., weight), to a line of cutting equipment configured for a range of body sizes including the size of the poultry fowl. At step 506, the cutting equipment severs the fowl's body into a front half, including the breasts, wings, ribs, and a portion of the backbone, and a "back half" or "saddle", including the thighs, legs, and the remaining portion of the backbone. After severance of the fowl's body, the front half is conveyed immediately, with no time delay for aging, to a poultry skinner 50 in accordance with the preferred embodiments of the present invention.

Continuing at step 508, the front half of the poultry fowl is placed, after the front half of a previous poultry fowl, in a serial manner atop the conveyor belt 124 near the first end 64 of the conveyor 60. The motor/gearbox assembly 114 rotates the conveyor's drive shaft 108 to cause the conveyor belt 124 to move between the poultry guides 128 and toward the conveyor's second end 66, thereby transporting the front half toward the skinning portion 54 of the poultry skinner 50. Upon reaching the second end 66 of the conveyor 60, the from half falls downward onto the elongated rollers 68 at a location near their first ends 74. The front half, after falling onto the elongated rollers 68, is transported by the downward sloping angle of the rollers 68 and the conveying motion of the helical teeth 216 and spaces 228 in a longitudinal path defined by the longitudinal axis 214 of the rollers 68 toward the discharge end 58 of the poultry skinner 50. The front half is transported primarily by the inner rollers 68b,68c and rapidly encounters the pinch gap 240 between elongated rollers 68b,68c. The counterrotation of elongated rollers 68b,68c tends to pull the front half partially into the pinch gap 240, thereby enabling the teeth 216 and spaces 228 of the rollers 68b,68c to better grasp and engage the skin. Once grasped between the teeth 216 and spaces 228 of the elongated rollers 68b,68c, the skin is pulled downward and apart from the front half by the continuing rotation of the elongated rollers 68b,68c.

In accordance with the first preferred method, the elongated rollers 68 continually propel the front half toward the discharge end 58 of the poultry skinner 50 while repeatedly grasping and pulling the remaining skin away from the front half. Water is also sprayed steadily onto the elongated rollers 68 and front half by the plurality of spraying nozzles 202 and shower head 204 depending from the top cover 182. Some of the larger portions of the removed skin fall between the elongated rollers 68 and into a first discharge chute 80 located beneath the elongated rollers 68. Some of the smaller portions of the removed skin adhere to the elongated rollers 68b,68c and are squeezed by the adjacent meshing rollers 68a, 68d, respectively, until the skin emulsifies and drips into the first discharge chute 80. In accordance with a second preferred method of the present invention, skin grasping and pulling is enhanced by the second reversed segments 364 of the elongated rollers 68. Upon reaching the second ends 76 of the elongated rollers 68, the front half falls, by gravity, into the first discharge chute 78. Removed skin, which tends to also be conveyed to the second ends 76 of the elongated rollers 68, is dislodged by the first reversed segments 302 and falls into the second discharge chute 80. In accordance with a third preferred method of the present invention, other removed skin falls through the gap 369 defined by the flat surfaces 362 of the elongated rollers 68.

After a front half falls into the first discharge chute 78, the front half, in accordance with the first preferred method, is transported non-stop to a deboning step 510 where the breasts, wings, and other products are harvested from the front half. At step 512, the first preferred method ends.

Whereas this invention has been described in detail with particular reference to its most preferred embodiments and methods, it will be understood that variations and modifications can be effected within the spirit and scope of the invention, as described herein before and as defined in the appended claims.

I claim:

1. An apparatus for removing the skin from a poultry fowl front portion, said apparatus comprising:

an elongated roller extending in a longitudinal direction between a first end and an opposed second end distant from said first end, said elongated roller defining a plurality of teeth and spaces extending spirally about said elongated roller, wherein said plurality of teeth and spaces define a helix angle extending in an angular direction relative to said longitudinal direction;

a support frame having a first portion proximate to said first end of said elongated roller and a second portion proximate to said second end of said elongated roller;

a first mounting assembly connected to said support frame and rotatively receiving said first end of said elongated roller at a first elevation; and a second mounting assembly connected to said support frame and distant from said first mounting assembly, said second mounting assembly rotatively receiving said second end of said elongated roller at a second elevation;

wherein said first elevation is higher than said second elevation.

2. The apparatus of claim 1 wherein, said plurality of teeth and spaces is a first plurality of teeth and spaces, and said elongated roller further defines a second plurality of teeth and spaces extending spirally about said elongated roller, said second plurality of teeth and spaces defining a helix angle extending in an angular direction relative to said longitudinal direction, wherein said angular direction of said helix angle of said second plurality of teeth and spaces is opposite said angular direction of said helix angle of said first plurality of teeth and spaces relative to said longitudinal direction.

3. The apparatus of claim 2 wherein, said elongated roller is a first elongated roller, said apparatus further includes a second elongated roller having a first end and a second end, said first mounting assembly rotatively receives said first end of said second elongated roller, said second mounting assembly rotatively receives said second end of said second elongated roller, and said first elongated roller and said second elongated roller diverge in a common plane and define a tapering gap therebetween.

4. The apparatus of claim 3 wherein, said tapering gap has a gap width between said first and second elongated rollers, and said gap width has a measure in the range between 0.0156 and 0.1875 inches at a location 0.75 inches from said first ends of said first and second elongated rollers.

5. The apparatus of claim 2, wherein said elongated roller further defines a third plurality of teeth and spaces extending spirally about said elongated roller, said third plurality of teeth and spaces defining a helix angle extending in an angular direction relative to said longitudinal direction, wherein said angular direction of said helix angle of said third plurality of teeth and spaces is opposite said angular direction of said helix angle of said first plurality of teeth and spaces relative to said longitudinal direction.

6. The apparatus of claim 5, wherein, said second plurality of teeth and spaces is located proximate to said second end of said elongated roller, a segment of said first plurality of teeth and spaces extends between said second plurality of teeth and spaces and said third plurality of teeth and spaces, and a segment of said first plurality of teeth and spaces extends between said third plurality of teeth and spaces and said first end of said elongated roller.

7. The apparatus of claim 6 wherein, said elongated roller is a first elongated roller, said apparatus further includes a second elongated roller extending in a longitudinal direction between a first end and an opposed second end distant from said first end, said second elongated roller defining a first plurality of teeth and spaces extending spirally about said second elongated roller, wherein said first plurality of teeth and spaces define a helix angle extending in an angular direction relative to said longitudinal direction of said second elongated roller, a second plurality of teeth and spaces extending spirally about said elongated roller, said second plurality of teeth and spaces defining a helix angle extending in an angular direction relative to said longitudinal direction of said second elongated roller, wherein said angular direction of said helix angle of said second plurality of teeth and spaces is opposite said angular direction of said helix angle of said first plurality of teeth and spaces relative to said longitudinal direction of said second elongated roller, and a third plurality of teeth and spaces extending spirally about said second elongated roller, said third plurality of teeth and spaces defining a helix angle extending in an angular direction relative to said longitudinal direction of said second elongated roller, wherein said angular direction of said helix angle of said third plurality of teeth and spaces is opposite said angular direction of said helix angle of said first plurality of teeth and spaces relative to said longitudinal direction of said second elongated roller, said first mounting assembly rotatively receives said first end of said second elongated roller, said second mounting assembly rotatively receives said second end of said second elongated roller, and said first elongated roller and said second elongated roller diverge in a common plane and define a tapering gap therebetween, wherein said teeth and spaces of said second plurality of teeth and spaces of said first elongated roller intermesh with said teeth and spaces of said second plurality of teeth and spaces of said second elongated roller, wherein said tapering gap separates said third plurality of teeth of said first elongated roller and said third plurality of teeth and spaces of said second elongated roller.

8. The apparatus of claim 7 wherein, a segment of said first plurality of teeth and spaces of said first elongated roller extends between said second plurality of teeth and spaces and said third plurality of teeth and spaces of said first elongated roller, a segment of said first plurality of teeth and spaces of said first elongated roller extends between said third plurality of teeth and spaces and said first end of said first elongated roller, a segment of said first plurality of teeth and spaces of said second elongated roller extends between said second plurality of teeth and spaces and said third plurality of teeth and spaces of said second elongated roller, and a segment of said first plurality of teeth and spaces of said second elongated roller extends between said third plurality of teeth and spaces and said first end of said second elongated roller.

9. The apparatus of claim 8, wherein said teeth and spaces of said second plurality of teeth and spaces of said first elongated roller intermesh with said teeth and spaces of said second plurality of teeth and spaces of said second elongated roller.

10. The apparatus of claim 1 wherein, said elongated roller is a first elongated roller, said apparatus further includes a second elongated roller having a first end and a second end, said first mounting assembly rotatively receives said first end of said second elongated roller, said second mounting assembly rotatively receives said second end of said second elongated roller, and said first elongated roller and said second elongated roller diverge in a common plane and define a tapering gap therebetween.

11. The apparatus of claim 10 wherein, said tapering gap has a gap width between said first and second elongated rollers, and said gap width has a measure in the range between 0.0156 and 0.1875 inches at a location 0.75 inches from said first ends of said first and second elongated rollers.

12. The apparatus of claim 1 wherein, said plurality of teeth and spaces is a first plurality of teeth and spaces, said elongated roller further defines a second plurality of teeth and spaces extending spirally about said elongated roller, said second plurality of teeth and spaces defining a helix angle with said longitudinal direction, and said elongated roller further defines a third plurality of teeth and spaces extending spirally about said elongated roller, said third plurality of teeth and spaces defining a helix angle with said longitudinal direction, wherein a portion of said first plurality of teeth and spaces is located between said second and third pluralities of teeth and spaces.

13. The apparatus of claim 12, wherein said second plurality of teeth and spaces is located proximate to said second end of said elongated roller.

14. The apparatus of claim 13, wherein said third plurality of teeth and spaces is located proximate to said first end of said elongated roller.

15. The apparatus of claim 12, wherein a portion of said first plurality of teeth and spaces is located between said first end of said elongated roller and said third plurality of teeth and spaces.

16. A method of processing a front portion of a poultry fowl, said method comprising the steps of:

interposing a poultry skinning apparatus having a plurality of downward sloping spirally-toothed elongated rollers within a poultry processing assembly line between a cutting device and a deboning device;

receiving a front portion of a poultry fowl at the skinning apparatus directly from the cutting device absent conventional aging of the front portion of the poultry fowl and in a random orientation relative to the skinning apparatus;

skinning the front portion of the poultry fowl in the skinning apparatus; and delivering the front portion of the poultry fowl directly to the deboning device.

17. A method of removing the skin from the front portion of a poultry fowl, said method comprising the steps of:

receiving the front portion of a poultry fowl on at least two downwardly sloping, rotating elongated rollers in a random orientation relative to the elongated rollers, each elongated roller having a first plurality of teeth and spaces extending spirally intermediate first and second ends of the elongated roller and extending at a helix angle oriented in an angular direction relative to the elongated axis of the respective elongated roller, the angular direction at which the first plurality of teeth and spaces of one elongated roller are oriented being opposite to the angular direction at which the first plurality of teeth and spaces of the other elongated roller are oriented;

propelling the front portion of the poultry fowl principally atop the elongated rollers in a direction defined from the first to the second ends of the elongated rollers in response to the rotation and downward slope of the elongated rollers; and grasping and pulling the skin downward between the elongated rollers.

18. The method of claim 17, wherein the step of grasping and pulling includes a step of initiating skin removal from the front portion of the poultry fowl by enabling the front portion of the poultry fowl to momentarily reside in a gap defined between the elongated rollers, wherein the gap tapers between a widest portion located near the first ends of the elongated rollers and a narrowest portion located nearer the second ends of the elongated rollers.

19. The method of claim 18, wherein the step of grasping and pulling includes a step of grasping of the skin by an other plurality of teeth and spaces of each elongated roller which other plurality of teeth and spaces of each elongated roller define helix angles extending in an angular direction relative to the elongated axis of the respective elongated roller which is opposite the angular direction of the helix angles of the first plurality of teeth and spaces of the respective elongated roller, wherein the other plurality of teeth and spaces of one elongated roller is separated from the other plurality of teeth and spaces of the other elongated roller by the gap between the elongated rollers.

20. An apparatus for removing the skin from a poultry fowl front portion, said apparatus comprising:

an elongated roller extending in a longitudinal direction between a first end and an opposed second end distant from said first end, said elongated roller defining a first plurality of teeth and spaces extending spirally about said elongated roller, said first plurality of teeth and spaces defining a helix angle extending in an angular direction relative to said longitudinal direction, a second plurality of teeth and spaces extending spirally about said elongated roller, said second plurality of teeth and spaces defining a helix angle extending in an angular direction relative to said longitudinal direction and opposite to said angular direction of said helix angle of said first plurality of teeth and spaces, and a flat surface laterally offset from a center of said elongated roller, said flat surface extending partially in said longitudinal direction and defining a chord of said elongated roller;

a support frame having a first portion proximate to said first end of said elongated roller and a second portion proximate to said second end of said elongated roller;

a first mounting assembly connected to said support frame and rotatively receiving said first end of said elongated roller; and a second mounting assembly connected to said support frame and distant from said first mounting assembly, said second mounting assembly rotatively receiving said second end of said elongated roller.

21. The apparatus of claim 20, wherein said flat surface is located proximate to said second end of said elongated roller.

22. An apparatus for removing the skin from a poultry fowl front portion, said apparatus comprising:
- a first elongated roller extending in a longitudinal direction between a first end and an opposed second end distant from said first end, said first elongated roller defining
  - a plurality of teeth and spaces extending spirally about said elongated roller between said first and second ends, wherein said plurality of teeth and spaces define a helix angle extending in an angular direction relative to said longitudinal direction, and
  - a flat surface laterally offset from a center of said first elongated roller, wherein said flat surface extends partially in said longitudinal direction and defines a chord of said first elongated roller;
- a second elongated roller extending in a longitudinal direction between a first end and an opposed second end distant from said first end, said second elongated roller defining
  - a plurality of teeth and spaces extending spirally about said second elongated roller between said first and second ends, wherein said plurality of teeth and spaces define a helix angle extending in an angular direction relative to said longitudinal direction of said second elongated roller, and
  - a flat surface laterally offset from a center of said second elongated roller, wherein said flat surface extends partially in said longitudinal direction of said second elongated roller and defines a chord of said second elongated roller;
- a support frame;
- a first mounting assembly connected to said support frame and rotatively receiving said first ends of said first and second elongated rollers; and
- a second mounting assembly connected to said support frame and distant from said first mounting assembly, said second mounting assembly rotatively receiving said second ends of said first and second elongated rollers;
- wherein said first elongated roller and said second elongated roller reside in a common plane and define a gap therebetween having a gap width; and
- wherein said flat surface of said first elongated roller opposes said flat surface of said second elongated roller at an instant of time.

23. The apparatus of claim 22, wherein said flat surface of said first elongated roller and said flat surface of said second elongated roller are located proximate to said second ends of said elongated rollers.

24. An apparatus for removing the skin from a poultry fowl front portion, said apparatus comprising:
- an elongated roller extending in a longitudinal direction between a first end and an opposed second end distant from said first end, said elongated roller defining
  - a plurality of teeth and spaces extending spirally about said elongated roller intermediate said first and second ends, said plurality of teeth and spaces defining a helix angle extending in an angular direction relative to said longitudinal direction, and
  - a flat surface laterally offset from a center of said elongated roller, said flat surface extending partially in said longitudinal direction and defining a chord of said elongated roller;
- a support frame;
- a first mounting assembly connected to said support frame and rotatively receiving said first end of said elongated roller; and
- a second mounting assembly connected to said support frame and distant from said first mounting assembly, said second mounting assembly rotatively receiving said second end of said elongated roller.

25. An apparatus for removing the skin from a poultry fowl front portion, said apparatus comprising:
- an elongated roller extending in a longitudinal direction between a first end and an opposed second end distant from said first end, said elongated roller defining a plurality of teeth and spaces extending spirally about said elongated roller intermediate said first and second ends, wherein said plurality of teeth and spaces define a helix with said longitudinal direction;
- a support frame;
- a first mounting assembly connected to said support frame and rotatively receiving said first end of said elongated roller; and
- a second mounting assembly connected to said support frame and distant from said first mounting assembly, said second mounting assembly rotatively receiving said second end of said elongated roller;
- wherein said elongated roller extends downwardly from said first end toward said second end, said elongated roller defining a slope angle with a horizontal plane; and
- wherein said second mounting assembly is repositionable relative to said support frame;
- whereby said slope angle is adjustable.

26. A method of removing the skin from the front portion of a poultry fowl, said method comprising the steps of:
- receiving the front portion of the poultry fowl on at least two elongated rollers, each having a first plurality of teeth and spaces extending spirally at helix angles about a longitudinal direction, which helix angles are opposite the helix angles of the first plurality of teeth and spaces of the other elongated roller and intermediate the first and second ends of the elongated rollers;
- propelling the front portion principally atop the elongated rollers in a longitudinal direction defined by the first and second ends of the elongated rollers;
- grasping and pulling the skin downward between the elongated rollers; and discharging removed skin from the elongated rollers between a gap defined by opposed flat surfaces defined by each elongated roller.

27. An apparatus for removing the skin from a poultry fowl front portion, said apparatus comprising:
- a first pair of elongated rollers, each elongated roller of said first pair of elongated rollers extending in a longitudinal direction between a first end and an opposed second end distant from said first end and defining a plurality of teeth and spaces extending spirally about same said elongated roller;
- a second pair of elongated rollers, each elongated roller of said second pair of elongated rollers extending in a longitudinal direction between a first end and an opposed second end distant from said first end and defining a plurality of teeth and spaces extending spirally about same said elongated roller;

a support frame;

a first mounting assembly connected to said support frame and rotatively receiving said first ends of said elongated rollers of said first and second pairs of elongated rollers; and a second mounting assembly connected to said support frame and distant from said first mounting assembly, said second mounting assembly rotatively receiving said second ends of said elongated rollers of said first and second pairs of elongated rollers;

wherein said teeth and spaces of said plurality of teeth and spaces of said elongated rollers of said first pair of elongated rollers intermesh;

wherein said teeth and spaces of said plurality of teeth and spaces of said elongated rollers of said second pair of elongated rollers intermesh;

whereby skin is removed from said poultry fowl front portion and from the elongated rollers to prevent skin build up on the elongated rollers, said elongated rollers of said pairs of elongated rollers defining a common plane, and said common plane of said elongated tollers and a horizontal plane defining an angle therebetween.

28. The apparatus of claim 27, wherein said angle has a measure in the range between 3 and 11 degrees.

29. The apparatus of claim 27 wherein, a pair of elongated rollers includes an inner elongated roller and an outer elongated roller adjacent said inner elongated roller, and said teeth of said plurality of teeth and spaces of said inner elongated roller mesh and partially define a gap within said spaces of said plurality of teeth and spaces of said outer elongated roller, whereby removed skin is squeezed between the elongated rollers and emulsified within the gap.

30. The apparatus of claim 29 wherein, said gap defines a gap width, and said gap width has a measure of 0.001 inches.

31. The apparatus of claim 27 wherein, each said pair of said first and second pairs of elongated rollers includes an inner elongated roller and an outer elongated roller adjacent said inner elongated roller, a portion of said teeth and spaces of said inner elongated roller of said first pair of elongated rollers intermesh with a portion of said teeth and spaces of said inner elongated roller of said second pair of elongated rollers, whereby rotation is imparted between pairs of elongated rollers.

32. The apparatus of claim 31 wherein, said inner elongated roller of said first pair of elongated rollers diverges from said inner elongated roller of said second pair of elongated rollers and defines a gap therebetween, and said gap tapers between said first ends of said inner elongated rollers of said first and second pairs of elongated rollers and a location where said teeth and spaces of said inner elongated rollers of said first and second pairs of elongated rollers begin to intermesh.

33. The apparatus of claim 32 wherein, said gap has a gap width, and said gap width has a measure at a location 0.75 inches from said first end of said inner elongated rollers of said first and second pairs of elongated rollers in the range between 0.0156 and 0.1875 inches.

34. The apparatus of claim 27 wherein, said apparatus further includes a drive train rotatively connected to an elongated roller of said first pair of elongated rollers, and an elongated roller of said first pair of elongated rollers rotates at a rate in the range between 140 and 225 revolutions per minute.

35. The apparatus of claim 27 wherein, said plurality of teeth and spaces of each elongated roller of each pair of elongated rollers defines a helix angle relative to said longitudinal direction, and said helix angle has a measure of 12.5 degrees.

36. The apparatus of claim 27, wherein said plurality of teeth and spaces of each elongated roller of each pair of elongated rollers includes a number of teeth in the range between 16 and 26 teeth.

37. The apparatus of claim 27, wherein each elongated roller of each pair of elongated rollers defines an outside diameter having a measure in the range between 1.5 and 2.25 inches.

38. The apparatus of claim 27, wherein each elongated roller of each said pair of elongated rollers defines a flat surface partially extending in a longitudinal direction and defining a chord of said elongated roller.

39. The apparatus of claim 38 wherein, each said pair of said first and second pairs of elongated rollers includes an inner elongated roller and an outer elongated roller adjacent said inner elongated roller, said elongated roller defining said flat surface is said inner elongated roller of said first pair of elongated rollers, said inner elongated roller of said second pair of elongated rollers defines a flat surface partially extending in a longitudinal direction and defining a chord of said inner elongated roller, and said flat surface of said inner elongated roller of said first pair of elongated rollers opposes said flat surface of said inner elongated roller of said second pair of elongated rollers at an instant of time, whereby removed skin is discharged between the flat surfaces of the inner elongated rollers.

40. The apparatus of claim 27 wherein, each said pair of said first and second pairs of elongated rollers includes an inner elongated roller and an outer elongated roller adjacent said inner elongated roller, said plurality of teeth and spaces of each said elongated roller of said first and second pairs of elongated rollers is a first plurality of teeth and spaces, each said first plurality of teeth and spaces of each said elongated roller of said first and second pairs of elongated rollers defines a helix angle extending in an angular direction relative to a respective longitudinal direction, each said elongated roller of said first and second pairs of elongated rollers further defines a second plurality of teeth and spaces extending spirally about each said elongated roller, said second plurality of teeth and spaces of each said elongated roller defining a helix angle extending in an angular direction relative to a respective longitudinal direction and opposite to said angular direction of said helix angle defined by said first plurality of teeth and spaces of same said elongated roller, said second plurality of teeth and spaces of said inner elongated roller of said first pair of elongated rollers intermeshes with said second plurality of teeth and spaces of said inner elongated roller of said second pair of elongated rollers, and said second plurality of teeth and spaces of said inner elongated roller of each said pair of elongated rollers intermeshes with said second plurality of teeth and spaces of said outer elongated roller of same said pair of elongated rollers, whereby the intermeshing of the second pluralities of teeth and spaces of the elongated rollers aids in discharging removed skin from the elongated rollers.

41. An apparatus for removing the skin from a poultry fowl front portion, said apparatus comprising:

a first downward elongated roller extending in a first longitudinal direction between a first end and an opposed second end distant from said first end, said first elongated roller defining a plurality of teeth and spaces extending spirally about said first elongated roller, wherein said plurality of teeth and spaces define a helix angle extending in an angular direction relative to said first longitudinal direction;

a second downward elongated roller extending in a second longitudinal direction between a first end and an opposed second end distant from said first end, said second elongated roller defining a plurality of teeth and spaces extending spirally about said second elongated roller, wherein said plurality of teeth and spaces define a helix angle extending in an angular direction relative to said second longitudinal direction;

a support frame;

a first mounting assembly connected to said support frame and rotatively receiving said first ends of said first and second elongated rollers; and a second mounting assembly connected to said support frame and distant from said first mounting assembly, said second mounting assembly rotatively receiving said second ends of said first and second elongated rollers;

wherein said first elongated roller and said second elongated roller define a gap therebetween, wherein said gap is a tapered gap extending from said first ends of said first and second elongated rollers to a location where said plurality of teeth and spaces of said first elongated roller begin to mesh with said plurality of teeth and spaces of said second elongated roller.

42. The apparatus of claim 41 wherein, said plurality of teeth and spaces of said first elongated roller is a first plurality of teeth and spaces of said first elongated roller, said plurality of teeth and spaces of said second elongated roller is a first plurality of teeth and spaces of said second elongated roller, said first elongated roller further defines a second plurality of teeth and spaces extending spirally about said first elongated roller, said second plurality of teeth and spaces defining a helix angle extending in an angular direction relative to said first longitudinal direction, wherein said angular direction of said helix angle of said second plurality of teeth and spaces of said first elongated roller opposes said angular direction of said helix angle of said first plurality of teeth and spaces of said first elongated roller relative to said first longitudinal direction, said second elongated roller further defines a second plurality of teeth and spaces extending spirally about said second elongated roller, said second plurality of teeth and spaces defining a helix angle extending in an angular direction relative to said second longitudinal direction, wherein said angular direction of said helix angle of said second plurality of teeth and spaces of said second elongated roller opposes said angular direction of said helix angle of said first plurality of teeth and spaces of said second elongated roller relative to said second longitudinal direction, said second plurality of teeth and spaces of said first elongated roller is located between said first end of said first elongated roller and said location where said first plurality of teeth and spaces of said first elongated roller begin to mesh with said first plurality of teeth and spaces of said second elongated roller, said second plurality of teeth and spaces of said second elongated roller is located between said first end of said second elongated roller and said location where said first plurality of teeth and spaces of said second elongated roller begin to mesh with said first plurality of teeth and spaces of said first elongated roller, and said second plurality of teeth and spaces of said first elongated roller opposes said second plurality of teeth and spaces of said second elongated roller across said gap.

43. The apparatus of claim 42 wherein, said first elongated roller further defines a third plurality of teeth and spaces extending spirally about said first elongated roller, said third plurality of teeth and spaces defining a helix angle extending in an angular direction relative to said first longitudinal direction, wherein said angular direction of said helix angle of said third plurality of teeth and spaces opposes said angular direction of said helix angle of said first plurality of teeth and spaces relative to said first longitudinal direction, said second elongated roller further defines a third plurality of teeth and spaces extending spirally about said second elongated roller, said third plurality of teeth and spaces defining a helix angle extending in an angular direction relative to said second longitudinal direction, wherein said angular direction of said helix angle of said third plurality of teeth and spaces opposes said angular direction of said helix angle of said first plurality of teeth and spaces relative to said second longitudinal direction, said third plurality of teeth and spaces of said first elongated roller are located proximate to said second end of said first elongated roller, said third plurality of teeth and spaces of said second elongated roller are located proximate to said second end of said second elongated roller, and said third plurality of teeth and spaces of said first elongated roller opposes said third plurality of teeth and spaces of said second elongated roller.

44. The apparatus of claim 43, wherein a portion of said first plurality of teeth and spaces of said first elongated roller extends between said second and third pluralities of teeth and spaces of said first elongated roller.

45. The apparatus of claim 43 wherein, said first elongated roller further defines a flat surface extending partially in said first longitudinal direction and defining a chord of said first elongated roller, and said second elongated roller further defines a flat surface extending partially in said second longitudinal direction and defining a chord of said second elongated roller.

46. The apparatus of claim 45 wherein, said flat surface of said first elongated roller is located proximate to said second end of said first elongated roller, said flat surface of said second elongated roller is located proximate to said second end of said second elongated roller.

47. The apparatus of claim 46, wherein said flat surface of said first elongated roller opposes said flat surface of said second elongated roller at an instant of time.

48. The apparatus of claim 42 wherein, said first elongated roller further defines a flat surface extending partially in said first longitudinal direction and defining a chord of said first elongated roller, and said second elongated roller further defines a flat surface extending partially in said second longitudinal direction and defining a chord of said second elongated roller.

49. The apparatus of claim 41 wherein, said plurality of teeth and spaces of said first elongated roller is a first plurality of teeth and spaces of said first elongated roller, said plurality of teeth and spaces of said second elongated roller is a first plurality of teeth and spaces of said second elongated roller, said first elongated roller further defines a second plurality of teeth and spaces extending spirally about said first elongated roller, said second plurality of teeth and spaces defining a helix angle extending in an angular direction relative to said first longitudinal direction, wherein said angular direction of said helix angle of said second plurality of teeth and spaces of said first elongated roller opposes said angular direction of said helix angle of said first plurality of teeth and spaces of said first elongated roller relative to said first longitudinal direction, said second elongated roller further defines a second plurality of teeth and spaces extending spirally about said second elongated roller, said second plurality of teeth and spaces defining a helix angle extending in an angular direction relative to said second longitudinal direction, wherein said angular direction of said helix angle of said second plurality of teeth and spaces of said second elongated roller opposes said angular direction of said helix angle of said first plurality of teeth and spaces of said second elongated roller relative to said second longitudinal direction, said second plurality of teeth and spaces of said first elongated roller is located proximate to said second end of said first elongated roller, and said second plurality of teeth and spaces of said second elongated roller is located proximate to said second end of said second elongated roller.

* * * * *